(12) United States Patent
Nagatomo et al.

(10) Patent No.: US 8,137,190 B2
(45) Date of Patent: Mar. 20, 2012

(54) GAME SERVER DEVICE, GAME TERMINAL DEVICE, SECONDARY GAME MANAGEMENT SYSTEM, AND SECONDARY GAME MANAGEMENT METHOD

(75) Inventors: Yasuyuki Nagatomo, Kobe (JP); Masakazu Shibamiya, Kobe (JP); Kazuma Konishi, Kobe (JP); Masahio Nishiyama, Miki (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 56 days.

(21) Appl. No.: 12/450,541

(22) PCT Filed: Mar. 24, 2008

(86) PCT No.: PCT/JP2008/055363
§ 371 (c)(1),
(2), (4) Date: Feb. 19, 2010

(87) PCT Pub. No.: WO2008/120591
PCT Pub. Date: Oct. 9, 2008

(65) Prior Publication Data
US 2010/0291999 A1 Nov. 18, 2010

(30) Foreign Application Priority Data
Mar. 30, 2007 (JP) .................. 2007-094640

(51) Int. Cl.
*G06F 17/00* (2006.01)
(52) U.S. Cl. ........................................................ 463/29
(58) Field of Classification Search .............. 463/16–29, 463/42
See application file for complete search history.

(56) References Cited

U.S. PATENT DOCUMENTS

| 5,737,495 A | 4/1998 | Adams et al. |
| 5,933,835 A | 8/1999 | Adams et al. |

(Continued)

FOREIGN PATENT DOCUMENTS
EP 1 704 902 9/2006
(Continued)

*Primary Examiner* — Ronald Laneau
(74) *Attorney, Agent, or Firm* — Jordan and Hamburg LLP

(57) ABSTRACT

A game server device communicably connected to a plurality of client terminal devices includes: a multiple-choice question communication control unit that obtains player capability information in information on a player who plays at a terminal device; a multiple-choice question related information storage unit that stores secondary games classified according to a player capability respectively; a multiple-choice question communication control unit that distributes to the terminal device in play a secondary game in a classification according to a capability of a player, who is in play, obtained from the terminal device; a multiple-choice question communication control unit that receives play results in regard to play of the distributed secondary game from the plurality of terminal devices; a multiple-choice question management unit that tabulates the play results received from the terminal devices respectively; and a multiple-choice question communication control unit that returns tabulated results to terminal devices that have transmitted play results. By allowing a player to play a secondary game that matches a capability of the player in the middle of playing a primary game, a more interesting game environment can be provided.

11 Claims, 27 Drawing Sheets

U.S. PATENT DOCUMENTS

| | | | |
|---|---|---|---|
| 5,974,454 A | 10/1999 | Apfel et al. | |
| 6,669,564 B1 | 12/2003 | Young et al. | |
| 6,848,997 B1 | 2/2005 | Hashimoto et al. | |
| 7,731,589 B2 * | 6/2010 | Kataoka et al. | 463/42 |
| 7,787,972 B2 * | 8/2010 | Schlottmann et al. | 700/91 |
| 2004/0102248 A1 | 5/2004 | Young et al. | |
| 2004/0111484 A1 | 6/2004 | Young et al. | |
| 2006/0040735 A1 * | 2/2006 | Baerlocher | 463/26 |
| 2006/0247012 A1 * | 11/2006 | Walker et al. | 463/20 |
| 2007/0149287 A1 | 6/2007 | Kubota et al. | |
| 2007/0259709 A1 * | 11/2007 | Kelly et al. | 463/20 |
| 2009/0170593 A1 | 7/2009 | Pacey | |

FOREIGN PATENT DOCUMENTS

| | | |
|---|---|---|
| JP | 2000-140413 | 5/2000 |
| JP | 3222864 | 8/2001 |
| JP | 2001-293143 | 10/2001 |
| JP | 2002-143566 | 5/2002 |
| JP | 3686049 | 11/2003 |
| WO | WO-00/44458 | 8/2000 |
| WO | WO-02/00317 | 1/2002 |
| WO | WO-2006/104731 | 10/2006 |

* cited by examiner

FIG.17

| Table.1 | DATA FOR "WHICH TILE WILL YOU DISCARD" QUESTIONS |
| --- | --- |
| | QUESTION ID |
| | QUESTION LEVEL |
| | QUESTION DATA |
| | PRO ANSWER DATA |
| | ANSWER RECEPTION PERIOD |
| | RESULT DISPLAY PERIOD |
| | |
| | |
| | |
| Table.2 | PLAYER ANSWER DATA |
| | PLAYER ID |
| | QUESTION ID |
| | ANSWER RESULTS |
| | |
| | |
| | |
| | |
| | |
| Table.3 | TABULATED DATA OF ANSWERS |
| | QUESTION ID |
| | NUMBER OF PEOPLE FOR EACH ANSWER |
| | |
| | |
| | |
| | |

GAME SERVER DEVICE, GAME TERMINAL DEVICE, SECONDARY GAME MANAGEMENT SYSTEM, AND SECONDARY GAME MANAGEMENT METHOD

TECHNICAL FIELD

The present invention relates to game terminal devices on which development of a game is controlled by receiving operations from a player, a game server device to which a plurality of these game terminal devices are connected, and which allows the execution of a secondary mini game separate from a primary game on each of the game terminal devices, as well as a secondary game management system and a secondary game management method.

BACKGROUND ART

Patent Document 1 describes that when an application to participate in a game is made by a subsequent player during the game of a preceding player, permission with respect to the participation application is carried out by the preceding player, and when participation is denied, the subsequent player is caused to play a secondary mini game.

Patent Document 2 describes a game machine such as a slot machine with a mini game control means that is configured to execute in response to a selection by a player, mini games that have been prepared in regard to multiple genres in a game standby period. Furthermore, Patent Document 3 describes a game system that is configured to enable play of a sub game so as to use efficiently a download waiting time of a primary game, with the sub game being offered during this period.

Although Patent Documents 1 to 3 are all similar in offering players a mini game different from a primary game, these are merely mini games that are completed by players individually, and are not offered to a multitude of other players. Furthermore, no consideration is given to a relationship between the mini games and player attributes, and no consideration is given in relation to informing [players] of game results, such that there is room for improvement in making use of mini games.

Patent Document 1: Japanese Patent Application Publication 2000-140413
Patent Document 2: Japanese Patent Application Publication 2001-293143
Patent Document 3: Japanese Patent Application Publication 2002-143566

DISCLOSURE OF INVENTION

An aim of the present invention is to provide a game server device, a game terminal device, a secondary game management system, and a secondary game management method that address the above-described problems.

According to one aspect of the present invention, a game server device which is communicably connected to a plurality of game terminal devices on which development of a game is controlled by receiving operations from players, and which is capable of monitoring at least whether or not a game is being executed, is provided with: player information receiving means for obtaining player capability information contained in information on a player who plays on a game terminal device; secondary game storage means for classifying, according to player capability, secondary games whose content differs from that of the game and storing the classified secondary games respectively; secondary game distribution means for distributing to the game terminal device during game execution a secondary game in the classification according to a capability of a player, who is in play, obtained from the game terminal device; play result receiving means for receiving play results in regard to play of the distributed secondary game from the plurality of game terminal devices; tabulating means for tabulating the play results received from the game terminal devices, respectively; and tabulated result transmitting means for returning the tabulated result to the game terminal devices that have transmitted the play results.

According to another aspect of the present invention, a game terminal device communicably connected to a game server device which is communicably connected to at least another game terminal device, and in which development of a game is controlled by receiving operations from a player, is provided with: player information transmitting means for transmitting player capability information contained in player information received from a player at a time of game commencement to the game service device; secondary game receiving means for receiving during game execution a secondary game, which is transmitted from the game server device, in which secondary games whose content differ from that of the game are classified according to a player capability respectively and stored, the second game to be received being classified according to a player capability; play result receiving means for receiving a play result of a player in the secondary game; play result transmitting means for transmitting a received play result to the game service device; and display processing means for receiving from the game server device a tabulated result of play results of the secondary game received from each game terminal device and performing display on a monitor.

According to yet another aspect of the present invention, a secondary game management system is provided with a plurality of game terminal devices on which development of a game is controlled by receiving operations from players and a game server device communicably connected to the plurality of game terminal devices, wherein the game terminal devices are provided with: player information transmitting means for transmitting player capability information contained in player information received from a player at a time of game commencement to the game service device; secondary game receiving means for receiving during game execution a secondary game, which is transmitted from the game server device, in which secondary games whose content differ from that of the game are classified according to a player capability respectively and stored, the second game to be received being classified according to a player capability; play result receiving means for receiving a play result of a player in the secondary game; play result transmitting means for transmitting a received play result to the game service device; and display processing means for receiving from the game server device a tabulated result of play results of the secondary game received from each game terminal device and performing display on a monitor, and are further provided with: player information receiving means for obtaining player capability information contained in information on a player who plays on a game terminal device; secondary game storage means for classifying, according to player capability, secondary games whose content differs from that of the game and storing the classified secondary games respectively; secondary game distribution means for distributing to the game terminal device during game execution a secondary game in the classification according to a capability of a player, who is in play, obtained from the game terminal device; play result receiving means for receiving play results in regard to play of the distributed secondary game from the plurality of game terminal devices; tabulating means for tabulating the play results received from the game terminal devices, respectively; and tabulated result transmitting means for returning the tabulated result to the game terminal devices that have transmitted the play results.

According to yet another aspect of the present invention, a secondary game management method provided with multiple game terminal devices on which development of a game is controlled by receiving operations from players and a game server device communicably connected to the multiple game terminal devices, and that provides a secondary game from the game server device to the game terminal devices during game execution, includes: storing secondary games, which are classified respectively according to capability and different from the game content, on the game server device, receiving at the game server device player capability information contained in player information received at a game terminal device at a time of game commencement at each game service device, distributing to these game terminal devices a secondary game of a division corresponding to a capability of a player in mid-play obtained from the game terminal device from which the player information was received, receiving a play result of the secondary game that was played using the game terminal device from which the player information was received, and transmitting this play result to the game server device, and tabulating at the game server device the play results received from the game terminal devices respectively, returning the tabulated results to the game terminal devices that transmitted the play results, and displaying the tabulated results on a monitor of each game terminal device.

With these configurations, during game play of a primary game, secondary games that take into account the capabilities of the player in that game are offered to a multitude of players during the game, and by tabulating results thereof and giving feedback to (informing) players of the results, a more absorbingly interesting game environment can be provided.

BRIEF DESCRIPTION OF THE DRAWINGS

FIG. 17 is a diagram showing one example of a table map of a database that constitutes a multiple-choice question related information storage unit.

BEST MODE FOR CARRYING OUT THE INVENTION

Figure 1:
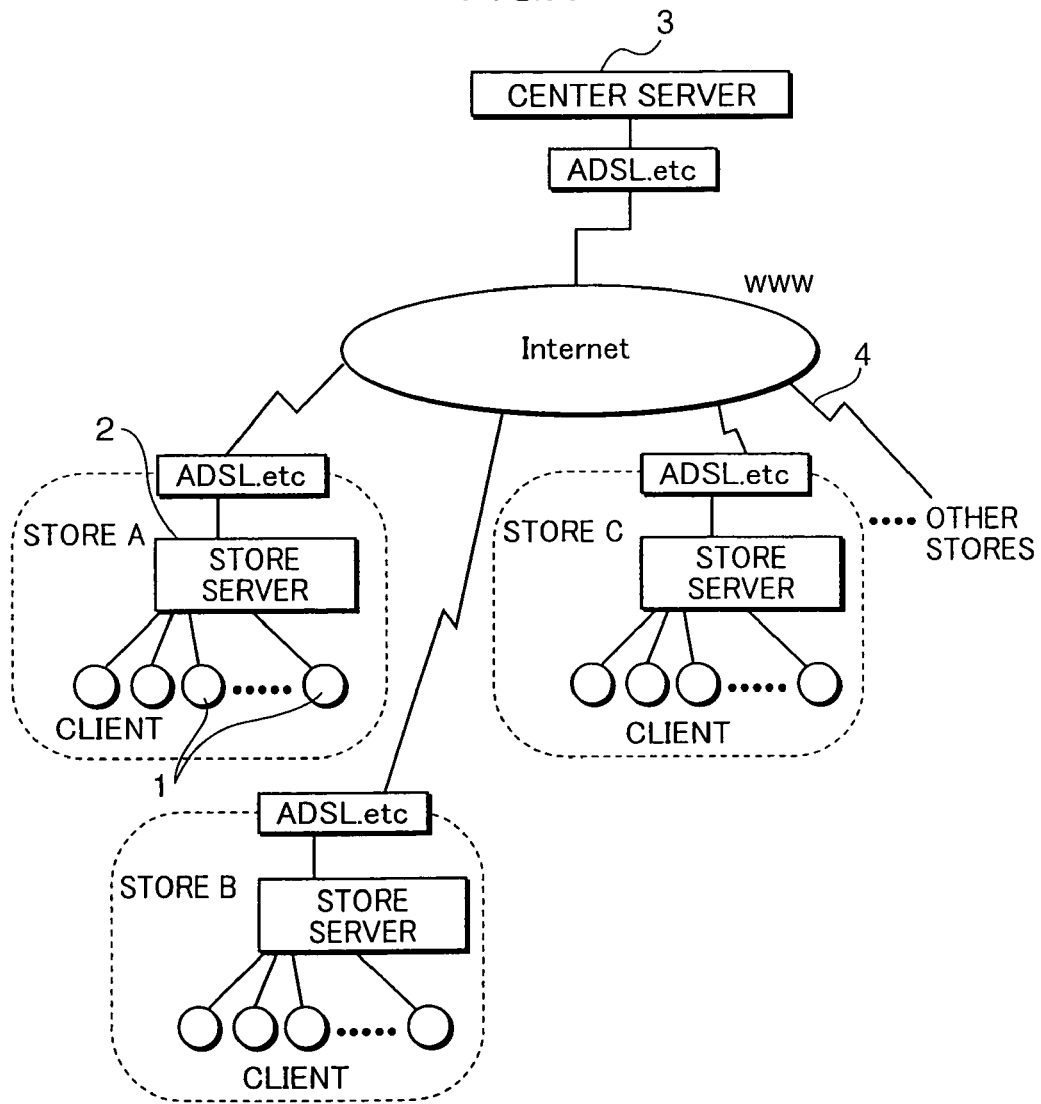
FIG. 1 is a configuration view of a game system in which game terminal devices and game server devices are applied according to the present invention.

FIG. 1 is a configuration view of a game system in which game terminal devices and game server devices are applied according to the present invention. A game system is provided with client terminal devices (game terminal devices) 1, each associated with identification information, store server devices 2 that are communicably connected to the multiple (here, eight) client terminal devices 1, and a center server device 3 that is communicably connected to the multiple store server devices 2 and manages a game, which is carried out by multiple players using the client terminal devices 1.

The client terminal devices 1 enable the game to advance by having players carry out predetermined operations based on game screens displayed on monitors. It should be noted that the identification information associated with the client terminal devices 1 includes identification information for each store server device 2 to which the client terminal device 1 is connected (or identification information of the store in which the client terminal device 1 is installed), and identification information (referred to as terminal number) for each client terminal device 1 inside a store in which client terminal devices 1 are installed. For example, in a case where "A" is identification information of a store A, and the identification information of a client terminal device 1 inside the store A is "4," the identification information of this client terminal device 1 is "A4."

The store server devices 2 are communicably connected to their respective multiple client terminal devices 1 and the center server device 3, and carry out transmission and reception of data between the client terminal devices 1 and the center server device 3.

The center server device 3, which is communicably connected to the multiple store server devices 2, stores player information in which a player ID is associated for specifying an individual player, and selects a player and another player (referred to as an opponent) to carry out a game in a same game space by carrying out transmission and reception of data with the client terminal devices 1 via the store server devices 2.

Figure 2:
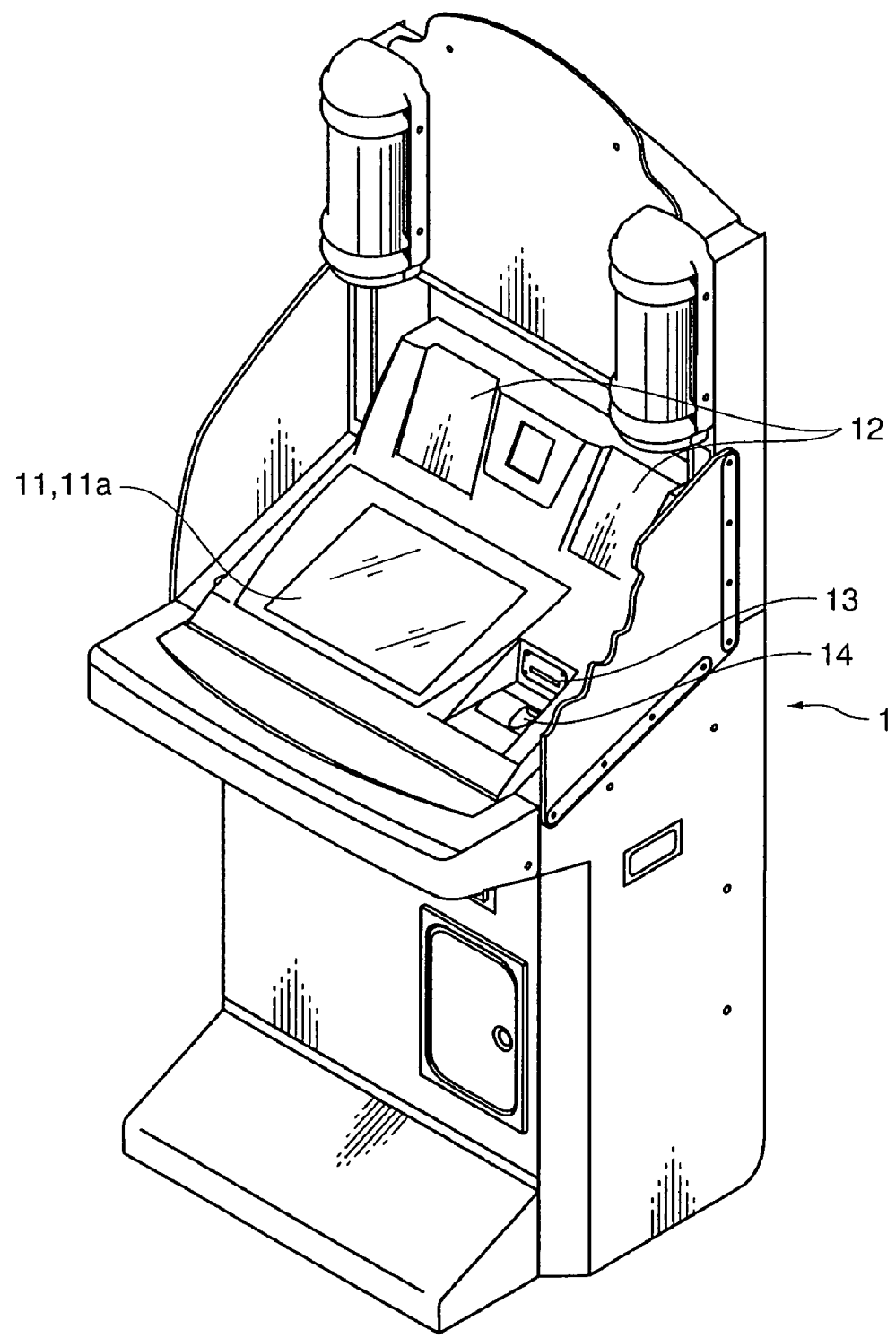
FIG. 2 is a perspective view showing an external appearance of one embodiment of a client terminal device.

FIG. 2 is a perspective view showing an external appearance of one embodiment of a client terminal device 1. It should be noted that a game carried out using the client terminal device 1 may be an individual game or may be a competitive game. In the present embodiment, a mahjong is assumed in which a player operating the client terminal device 1 competes against at least one of a player operating another client terminal device 1 and a CPU player. In the case of competing against a player operating another client terminal device 1, transmission and reception of operational data is carried out in response to the content operated by each player between the client terminal devices 1 during competition via a network communication unit 18, which is described later, and a store server device 2.

The client terminal device 1 is provided with a monitor 11 on which a game screen is displayed, a touch panel 11a that determines which button has been indicated from an address of a button prompting a selection of the like displayed on the game screen of the monitor 11 and a position pressed by the player, speakers 12 that output audio, a card reader 13 that reads in information such as a user ID stored on an individual card, and a coin receiving unit 14 that receives coin(s) inserted by the player. The monitor 11 displays images and may be a liquid crystal display or a plasma display or the like. On the monitor 11, a primary game is displayed in a main portion thereof, and images relating to a secondary game are displayed on a predetermined portion (small screen) on a right side portion as is shown in FIGS. 24 to 27, which are described later. Furthermore, the individual card is a magnetic card or an IC card or the like on which individual information such as card ID and the like is stored.

A control unit 16 (see FIG. 3), which is configured by a microcomputer or the like that [receives] detection signals from each unit and outputs control signals to each unit, is installed in an appropriate location in the client terminal device 1.

Figure 3:
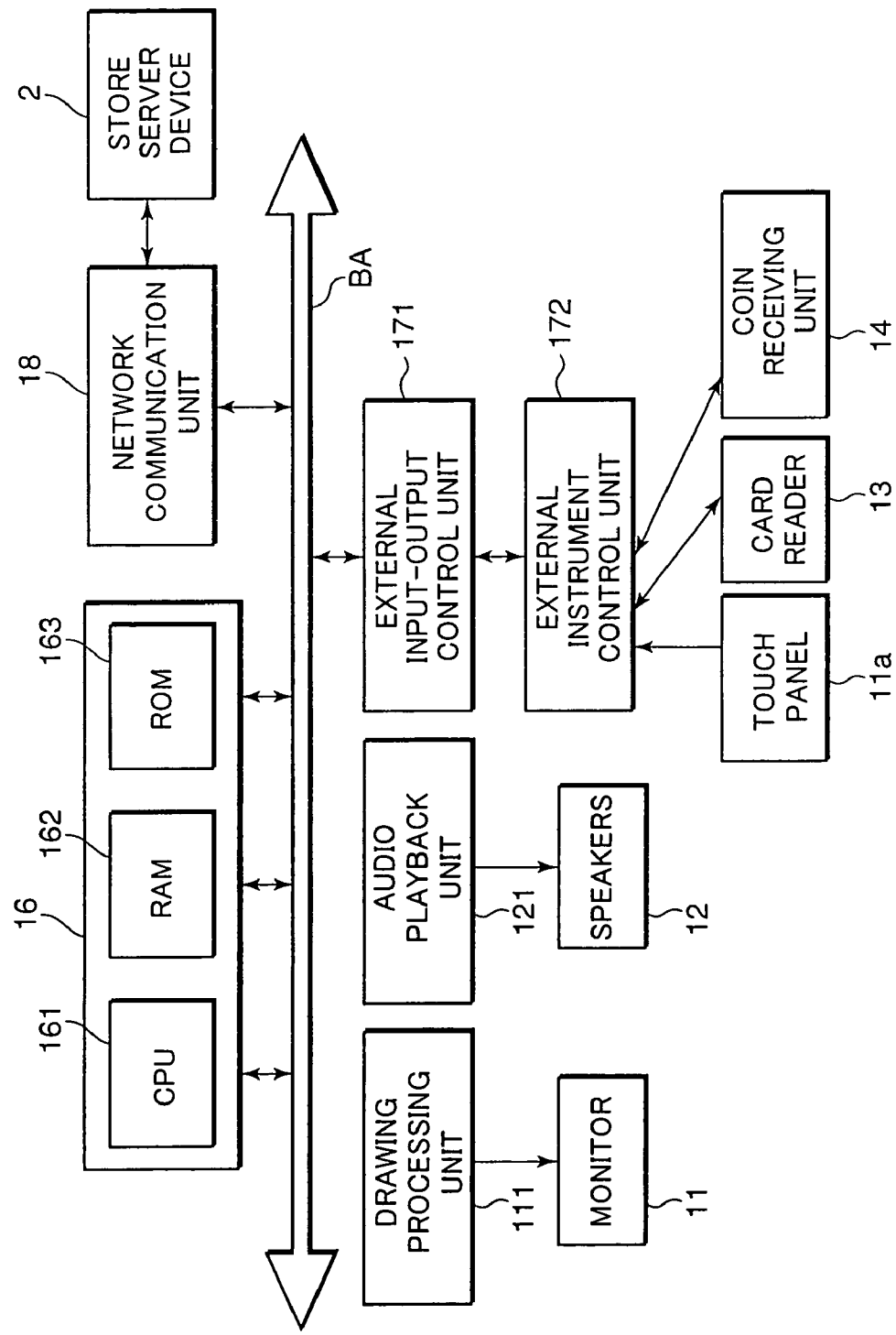
FIG. 3 is a hardware configuration view showing one embodiment of the client terminal device.

FIG. 3 is a hardware configuration view showing one embodiment of the client terminal device 1. The control unit 16 controls overall operations of the client terminal device 1 and is provided with an information processing unit (CPU) 161 that carries out various types of information processing such as processing relating to general game development and image display processing, a RAM 162 that temporarily stores information and the like during processing, and a ROM 163 on which is stored in advance predetermined image information and game programs and the like, which are described later.

An external input-output control unit 171 converts detection signals to digital signals for processing between the control unit 16 and detection units including the card reader 13, the touch panel 11a, and the coin receiving unit 14, and also converts instruction information to control information for output to various instruments of the detection units, and the signal processing and input-output processing involved here is carried out in a time division manner for example. An external instrument control unit 172 carries out output operations of control signals to the various instruments of the detection units and input operations of detection signals from the various instruments of the detection units within time division periods respectively.

A drawing processing unit 111 displays required images on the monitor 11 in accordance with image display instructions from the control unit 16, and is provided with a video RAM and the like. An audio playback unit 121 outputs predetermined messages and background music and the like to the speakers 12 in accordance with instructions from the control unit 16.

Mahjong tile characters, background images, images of various screens, and the like are stored on the ROM 163. The mahjong tile characters and the like are configured by a required number of polygons so as to enable three-dimensional drawing thereof and, based on drawing instructions from the CPU 161, the drawing processing unit 111 carries out calculations to convert positions in a three-dimensional space to positions in a pseudo three-dimensional space, and light source calculation processing and the like, then carries out writing processing based on results of the above-mentioned calculations for image data to be drawn to the video RAM, for example a writing (pasting) process of texture data to an area of the video RAM specified as a polygon. Furthermore, the ROM 163 may also store basic images that constitute screens for displaying multiple-choice questions, which are secondary games as described later, and screens for displaying tabulated results.

Here, description is given of a relationship between operations of the CPU 161 and operations of the drawing processing unit 111. Based on an image display processing unit, which carries out output of image information from inside or outside to the monitor 11 and the display thereof, and an operating system (OS) recorded on the detachable ROM 163, the CPU 161 reads out images, audio, control program data, and game program data from the ROM 163. A portion or all of the images, audio, control program data, and the like that have been read out are held in the RAM 162. Thereafter the CPU 161 proceeds with processing based on the control programs, various types of data (image data including text images and other images such as polygons of displays and textures, and audio data), which are being stored in the RAM 162, as well as detection signals and the like from the detection units.

Among various data stored on the ROM 163, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example.

The network communication unit 18 is for performing transmission and reception of operational information of the player and event information and the like that occur during execution of a mahjong game via a network and the store server device 2 or the like with regard to the client terminal device 1 during competition. Furthermore, the network communication unit 18 is for performing transmission and reception of information between the client terminal devices 1 and the center server device 3 via a network and the store server devices 2 and the like relating to individual authentication and the like during reception processing for new players before and after game execution, and information relating to game results at the time of completion of games and multiple-choice questions during game execution.

Figure 4:
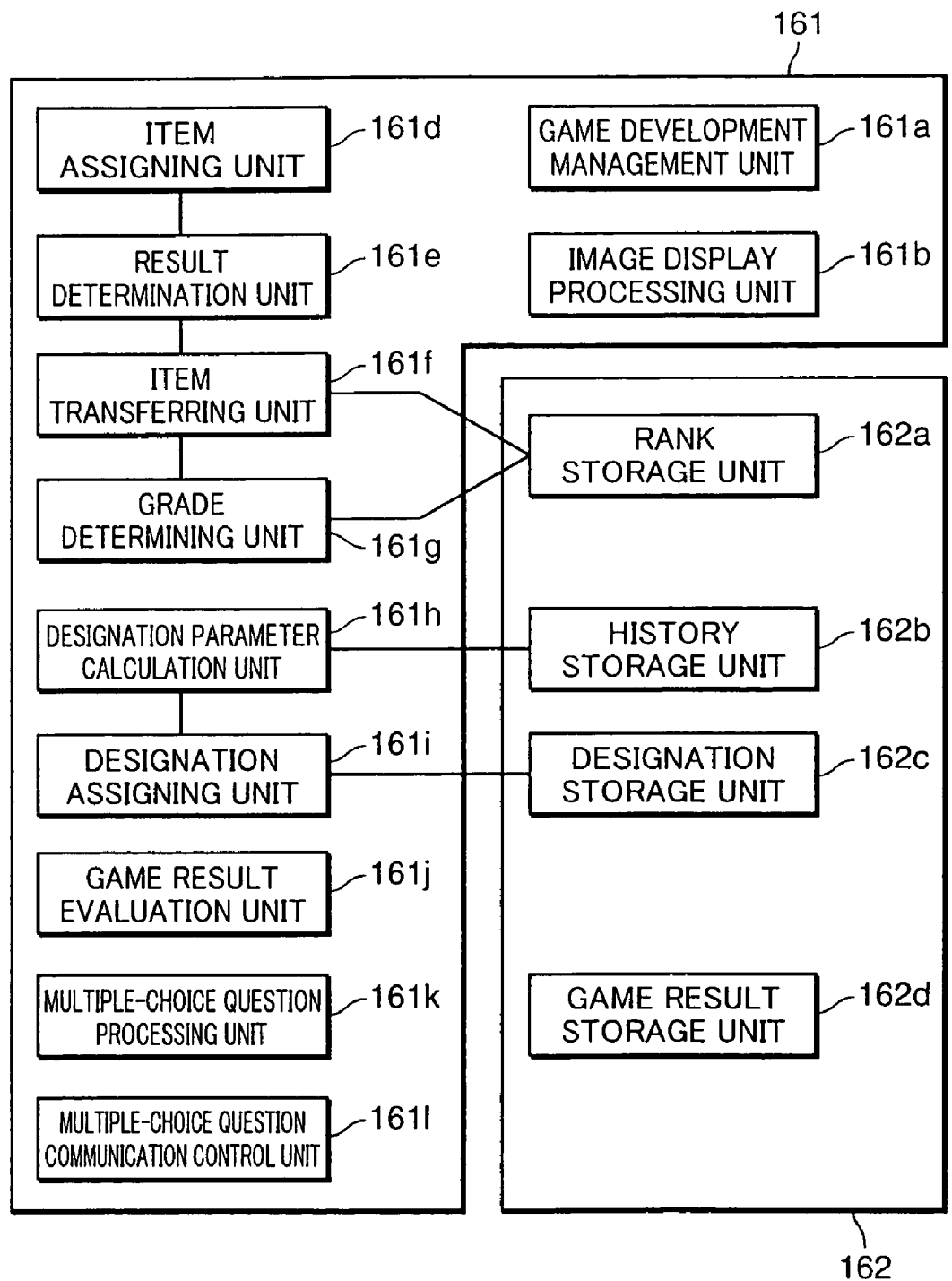
FIG. 4 is a function configuration view of a control unit of the client terminal device.

FIG. 4 is a function configuration view of a control unit 16 of the client terminal device 1. The CPU 161 of the control unit 16 is provided with a game development management unit 161a that manages a series of processes to control development of a game accompanying commencement of the game, development during the game and until completion of the game, and information communication, an image display processing unit 161b that displays required images (game images of the primary game and secondary game related images) on a monitor 3, an item assigning unit 161d that virtually assigns items of a predetermined numerical amount to the player, a result determination unit 161e that determines the player's ranking in the game at the completion of each game, an item transferring unit 161f that transfers between players a predetermined numerical amount of items virtually held by the players based on a determination result by the result determination unit 161e, a grade determining unit 161g that determines a grade (corresponding to a class) that indicates a level of strength of that player in the game based on the quantity of items virtually held by the player, a designation parameter calculation unit 161h that calculates a designation parameter indicating a feature of the player in the game based on history data stored in a history storage unit 162b to be described later, a designation assigning unit 161i that assigns a player designation to players in the game based on the calculated designation parameters, a game result evaluation unit 161j that obtains game results at the time of completion of the game by evaluating operations of the player during the game, a multiple-choice question processing unit 161k that executes a series of processes on multiple-choice questions that are distributed from the center server device 3 and are described later, and a multiple-choice question communication control unit 161l that carries out communication control of information relating to multiple-choice questions.

Furthermore, the RAM 162 of the control unit 16 is provided with a grade storage unit 162a that stores item quantities and grade information associated with player designations, a history storage unit 162b that stores for each player the past game history data of the player, a designation storage unit 162c that stores designations assigned by the designation assigning unit 161h associated with each designation of the player, and a game result storage unit 162d that stores a value of a number of chips held by the player evaluated by the game result evaluation unit 161j.

The item assigning unit 161d virtually assigns items (here, items called dragon chips) to players who meet a predetermined condition, and increase/decrease points virtually possessed by the players, and store item numbers and points associated with each designation of player in the grade storage unit 162a.

The result determination unit 161e determines a ranking in order of highest points virtually held as chips by the players when a predetermined number of games has been completed at a table selected by a selection unit 361b, which is described later. However, at the commencement of a game, the numbers of points (referred to as starting points) virtually held as chips by the players are equivalent. For example, the starting points may be 20,000 points.

The item transferring unit 161f is a unit that, after the ranking has been determined by the result determination unit 161e, transfers among the players a predetermined quantity of items virtually held by the players based on the determination result of the result determination unit 161e and the number of games played.

The grade determining unit 161g determines a grade indicating a level of strength in the game of a player based on the number of items virtually held by that player, and stores this in the grade storage unit 162a associated with the designation of the player, and transmits grade information to the center server device 3 via the network communication unit 18, a network, and the store server devices 2 or the like.

When the determination of grade carried out by the grade determining unit 161g is determined to be an initial grade, the designation parameter calculation unit 161h calculates a designation parameter indicating a feature of the player in the game based on history data stored in the history storage unit 162b, which is described later. The parameters, which are defined below, include a winning rate, a feeding rate, a mean lucky ('dora') tile number and a mean hand point number.

(Winning rate)=(aggregate number of wins)/(aggregate number of games played)

(Feeding rate)=(aggregate number of feeds)/(aggregate number of games played)

(Mean lucky tile number)=(aggregate number of lucky tiles at time of winning)/(aggregate number of wins)

(Mean hand point number)=(aggregate number of hand points at time of winning)/(aggregate number of wins)

It should be noted that the aggregate number of wins, aggregate number of feeds, aggregate number of games played, aggregate number of lucky ('dora') tiles at time of winning, aggregate number of hand points at time of winning, and the aggregate number of wins used in the above expressions are associated with the identification information of the player and stored in the history storage unit 162b, which is described later.

The designation assigning unit 161i virtually assigns a player designation to the players in the game based on the designation parameters calculated by the designation parameter calculation unit 161h when the determination of grades carried out by the grade determining unit 161g is determined to be an initial grade, then stores this in the designation storage unit 162c associated with the designation of the player, and transmits designation information to the center server device 3 via the network communication unit 18, a network, and the store server devices 2 or the like.

The game result evaluation unit 161j obtains game results at the time of the end of a game by evaluating player operations in the game in accordance with predetermined rules. The game results indicate results in which player operations during the game are evaluated. Specifically, the game results indicate the number of chips held by each player, which fluctuate up and down from the time of game commencement to the time of game completion, as a game result after the completion of the game.

The multiple-choice question processing unit 161k displays a predetermined number of multiple-choice questions distributed from the center server device 3 on the monitor 11 via the image display processing unit 161b, receives a desired answer from the displayed questions via the touch panel 11a, and uses the multiple-choice question communication control unit 161l to transmit the received answer to the center server device 3. Furthermore, the multiple-choice question processing unit 161k receives a tabulated result from the center server device 3, which tabulates the content of answers sent from a plurality of client terminal devices 1, and displays the tabulated result on the monitor 11 through the image display processing unit 161b. Furthermore, the multiple-choice question processing unit 161k manages whether or not a multiple-choice question (secondary game) of a division corresponding to player capabilities has been answered (played), and grants permission to be able to answer a multiple-choice question other than the division corresponding to the player capabilities with the act of answering being a condition.

The grade storage unit 162*a* stores the numbers of items, which have been assigned by the item assigning unit 161*d* and updated by the item transferring unit 161*f*, and the grades that have been determined by the grade determining unit 161*g* associated with the player designations.

For each player, the history storage unit 162*b* stores as past game history data of the player, data such as the aggregate number of wins, which is an aggregate number of times the player has won, the aggregate number of feeds, which is an aggregate number of times the player has performed feeding, the aggregate number of games played, which is an aggregate number of games the player has played, the aggregate lucky tile number, which is an aggregate number of lucky tiles held in the player's hand at the time of winning, the aggregate hand point number, which is an aggregate number of hand points held in the player's hand at the time of winning, and the aggregate number of wins, which is an aggregate number of times of winning.

The designation storage unit 162*c* stores data such as values of designation parameters calculated by the designation parameter calculation unit 161*h* and designations assigned by the designation assigning unit 161*i*.

The game result storage unit 162*d* stores values of numbers of chips held by the player evaluated (calculated) by the game result evaluation unit 161*j* associated with the name of the player.

Figure 5:
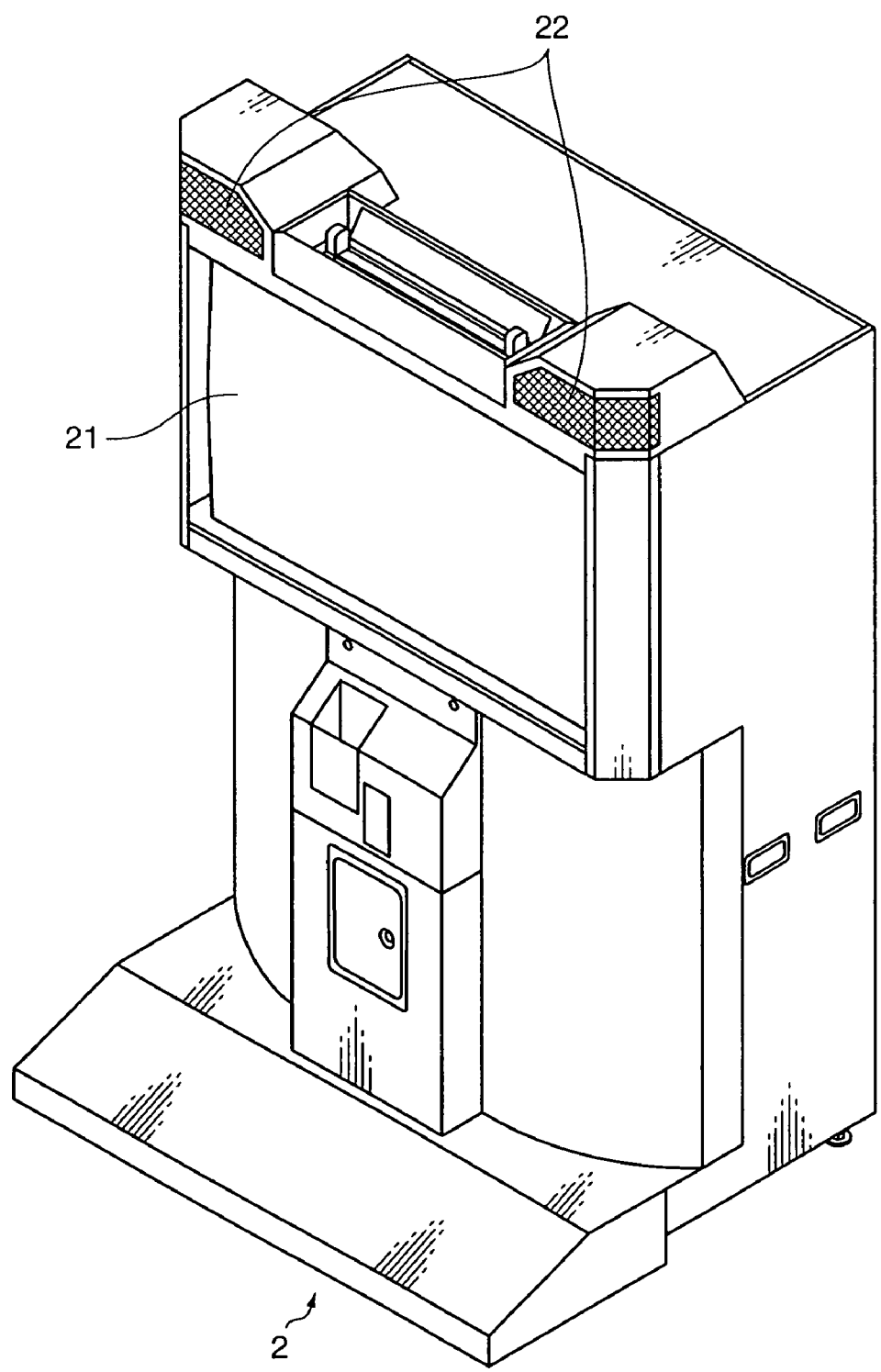
FIG. 5 is a perspective view showing an external appearance of one embodiment of a store server device.

FIG. 5 is a perspective view showing an external appearance of one embodiment of a store server device 2. The store server device 2 is provided with a monitor 21 that displays game screens and the like, and speakers 22 that output audio. The speakers 22 output predetermined messages and background music.

A control unit 26 (see FIG. 6), which is configured by a microcomputer or the like that receives detection signals from each unit and outputs control signals to each unit, is installed in an appropriate location in the store server device 2.

Figure 6:
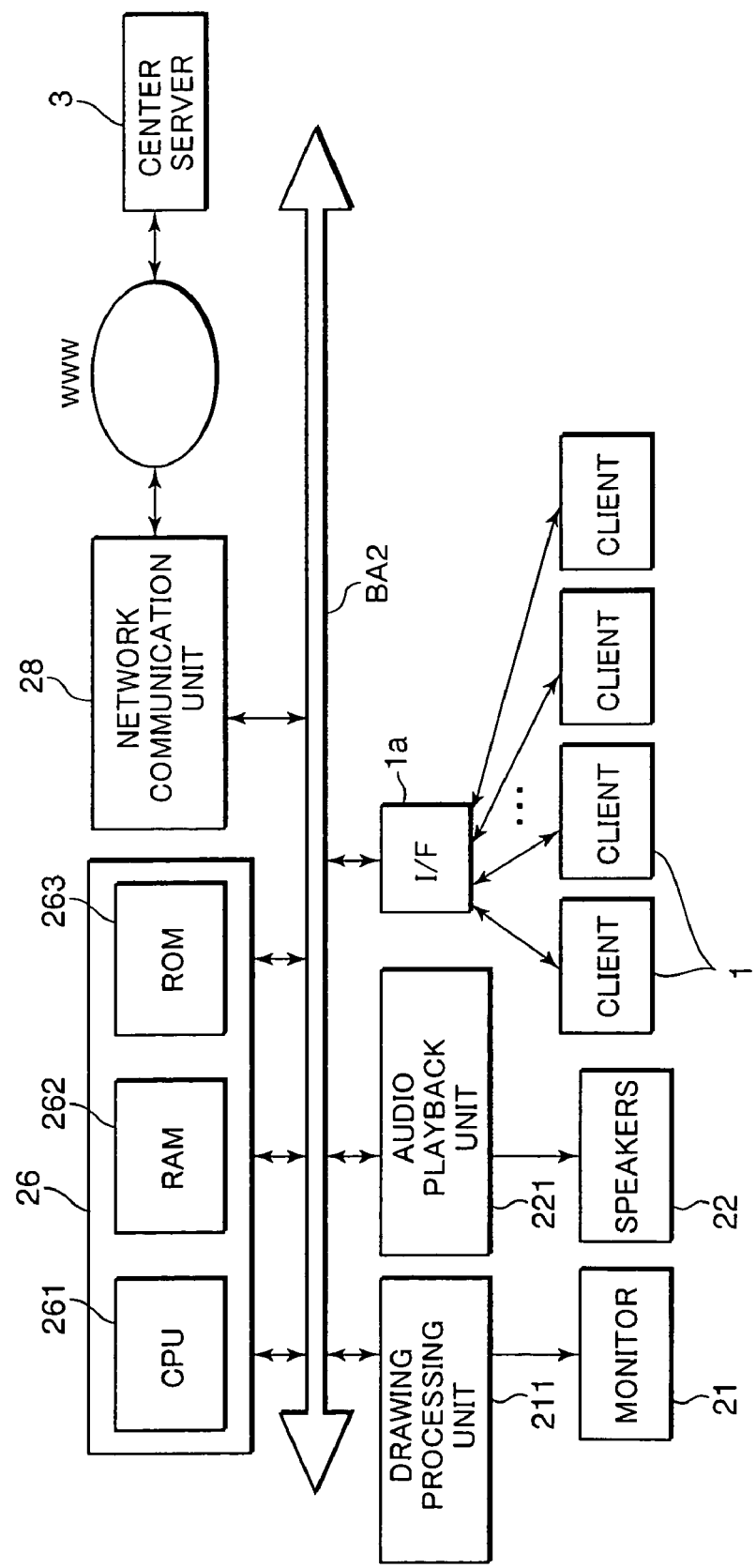
FIG. 6 is a hardware configuration view showing one embodiment of the store server device.

FIG. 6 is a hardware configuration view showing one embodiment of the store server device 2. The control unit 26 controls overall operations of the store server device 2 and is provided with an information processing unit (CPU) 261, a RAM 262 that temporarily stores information and the like during processing, and a ROM 263 on which is stored in advance predetermined image information, and the like.

A drawing processing unit 211 displays required images on the monitor 21 in accordance with image display instructions from the control unit 26, and is provided with a video RAM and the like. An audio playback unit 221 outputs predetermined messages and background music and the like to the speakers 22 in accordance with instructions from the control unit 26.

Among various data stored on the ROM 263, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example. A network communication unit 28 performs transmission and reception of various data with the center server device 3 via a network constituted by the World Wide Web (WWW) or the like. An interface unit 1*a* is for exchanging data between the plurality of (for example, eight) client terminal devices 1 connected to the store server device 2.

The control unit 26 transmits information, in which terminal identification information received from the center server device 3 via the network communication unit 28 has been assigned, via the interface unit 1*a* to the client terminal device 1 corresponding to that terminal identification information. Furthermore, it transmits information, in which terminal identification information received from the client terminal device 1 via the interface 1*a* has been assigned, to the center server device 3 via the network communication unit 28.

Figure 7:
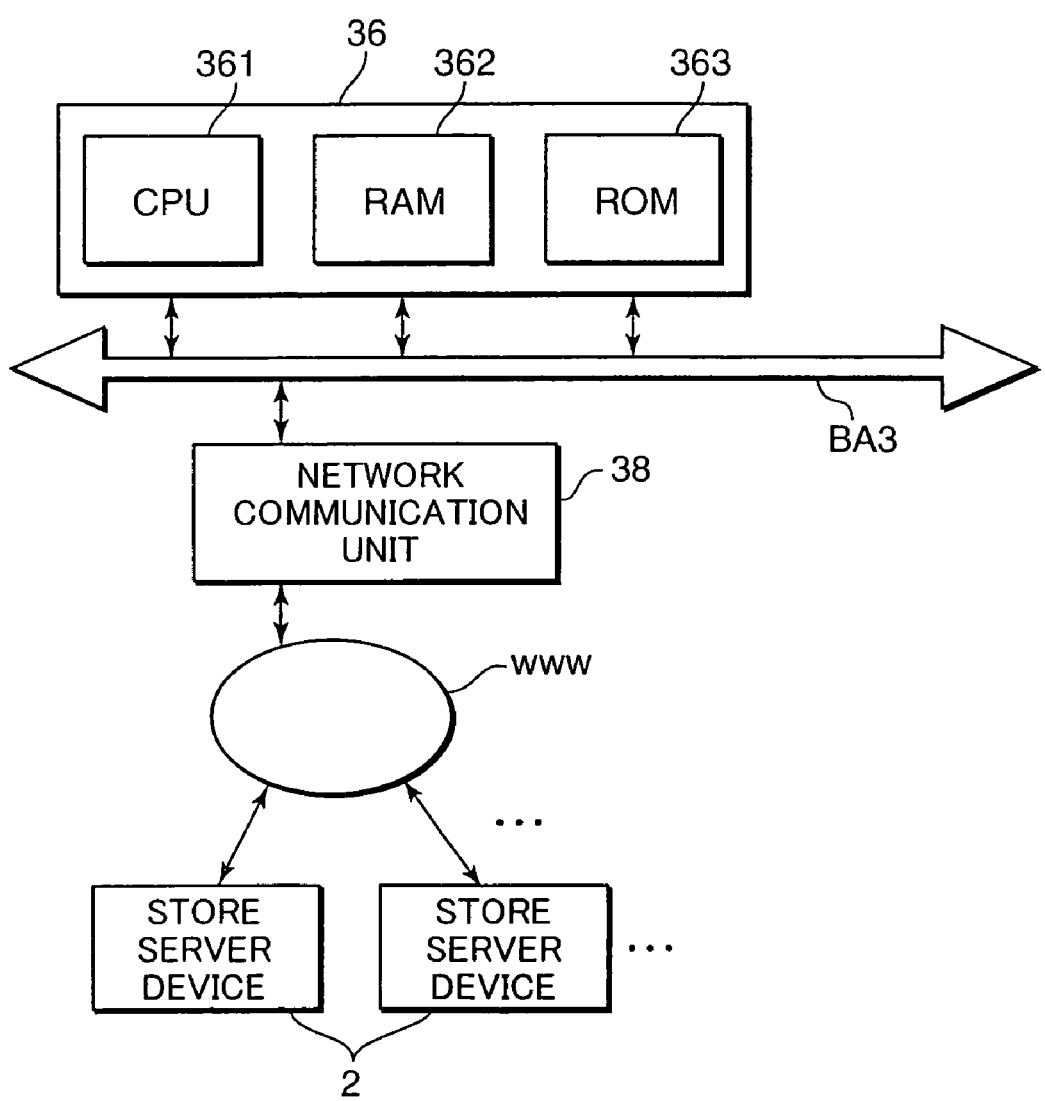
FIG. 7 is a hardware configuration view showing one embodiment of a center server device.

FIG. 7 is a hardware configuration view showing one embodiment of a center server device 3 according to the present invention. A control unit 36 controls overall operations of the center server device 3 and is provided with an information processing unit (CPU) 361, a RAM 362 that temporarily stores information and the like during processing, and a ROM 363 on which is stored in advance predetermined image information, individual information of the players, player information relating to the game for each player, and the like. The RAM 362 also functions as a database (see FIG. 17) that stores information relating to multiple-choice questions.

Among various data stored on the ROM 363, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example.

A network communication unit 38 performs information transmission and reception of various data among corresponding client terminal devices 1 in accordance with terminal identification information through any of the plurality of store server devices 2 via a network constituted by the WWW or the like.

It should be noted that a game management program and a multiple-choice question management program are recorded on the ROM 363 then loaded into the RAM 362, and the respective functions thereof are achieved by successively executing the game management program in the RAM 362 by the CPU 361. A multiple-choice question management program refers to a program for managing processing for presenting multiple-choice questions of a level (degree of difficulty) corresponding to a grade, which refers to capabilities (strength) in a mahjong game, to players (to relevant client terminal devices 1) during play of a mahjong game or multiple-choice questions of another level, then prompting answers, and carrying out a tabulating process on the various answers from the multiple players, as well as providing feedback during tabulating or of tabulated results to the players who answered.

Figure 8:
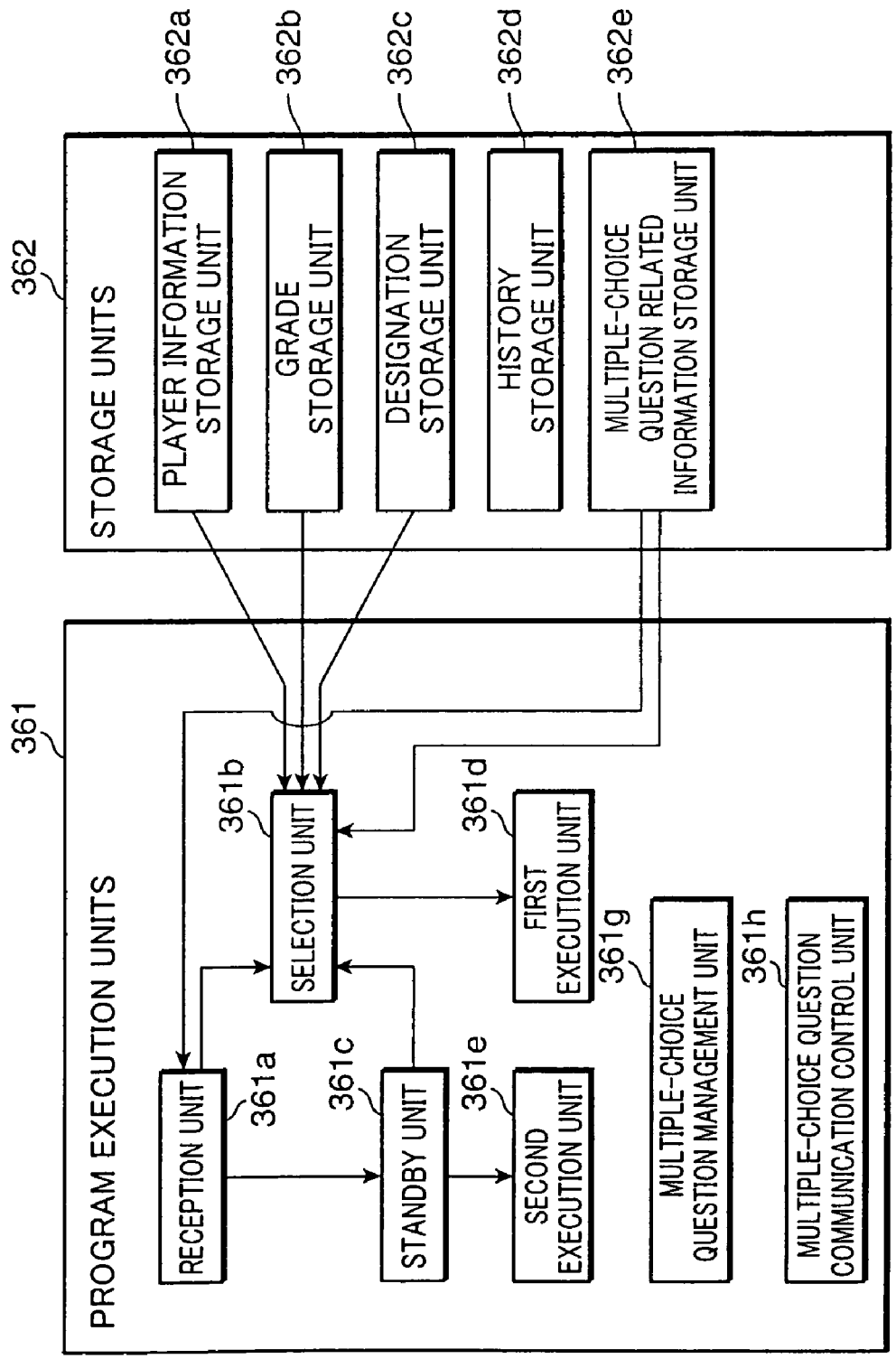
FIG. 8 is a function configuration view of a control unit of the center server device.

FIG. 8 is a function configuration view of a control unit 36 of the center server device 3. A CPU 361 of the control unit 36 is provided with a reception unit 361*a* that handles reception of participation of players to a game at the commencement of a game at each of the client terminal devices 1, a selection unit 361*b* that selects players received by the reception unit 361*a* and players of a predetermined maximum number (here, three) or less and a predetermined number (here, two) or more that are to play in a same game space from among players who have been put into a standby state by a standby unit 361*c* to be described later in accordance with predetermined rules, a standby unit 361*c* that puts players who are in a state of not being selected by the selection unit 361*b* into a standby state, and causes the selection unit 361*b* to execute selection on these players, a first execution unit 361*d* that causes execution of the game in a same game space among players selected by the selection unit 361*b*, a second execution unit 361*e* that causes execution of the game in a same game space among player(s) that have been put in a standby state by the standby unit 361*c* and a CPU player(s), a multiple-choice question management unit 361*g* that manages processes such as selecting multiple-choice questions according to a correspondence between a grade, which refers to capabilities (strength) of a player in a mahjong game, and a level (degree of difficulty) of a multiple-choice question, determining whether the question is already answered or unanswered, and performing a tabulating process on the answers, and a multiple-choice question communication control unit 361h that carries out communication control on given information managed by the multiple-choice question management unit 361g and answer information from each of the client terminal devices 1.

The RAM 362 is provided with a player information storage unit 362a that stores individual information such as user ID data, a grade storage unit 362b that stores class information indicating a level of strength of a player in the game associated with player identification information (user ID data), a designation storage unit 362c that stores designation information indicating a tactical feature of a player in the game associated with player identification information, a history storage unit 362d stores information such as the aggregate number of wins, aggregate number of feeds, aggregate number of games played, aggregate number of lucky tiles at time of winning, aggregate number of hand points at time of winning, and the aggregate number of wins, which is information of past competition results of the player in the game, associated with the player identification information, and a multiple-choice question related information storage unit 362e that stores respective required data types relating to multiple-choice questions as shown in FIG. 17. It should be noted that details of the multiple-choice question related information storage unit 362e are described with FIG. 17.

The reception unit 361a receives individual information such as user ID data or the like of the players transmitted from each client terminal device 1, and handles participation of players into the game based on the player information stored in the player information storage unit 362a.

The selection unit 361b selects (combines) players received by the reception unit 361a and two or more or three or less players to play in the same game space from among players that have been put into a standby state by the standby unit 361c in accordance with processing rules, which are here based on the classes stored in the grade storage unit 362b and designations stored in the designation storage unit 363c. Further still, in a case where the number of selected players is less than three (namely, two), the selection unit 361b selects a player at least a further one time. Specifically, it selects a player whose difference in class (grade) with the other players is within two classes. It should be noted that selection conditions may also be included in regard to designations. It should also be noted that in the present example, the selection unit 361b assigns a selection number for example in order of selection to the client terminal devices 1 that have been selected.

In a case where a player is not selected by the selection unit 361b, the standby unit 361c puts that player into a standby state, and causes the selection unit 361b to execute player selection. A standby state is a state of waiting for an opponent to be selected by the selection unit 361b.

The first execution unit 361d causes execution of the game in the same game space among players selected by the selection unit 361b. That is, it transmits to the client terminal devices 1 to be used by the selected players instruction information to an effect that the game is to be executed among players selected by the selection unit 361b as opponents (with the players virtually sitting at a same table).

The second execution unit 361e causes execution of a game in a same game space between the player that has been put in a standby state by the standby unit 361c and the CPU player.

The multiple-choice question management unit 361g ascertains an answerer level by referencing the grade storage unit 362b from individual information of a player's individual card that has been read by the card reader 13 of the client terminal device 1, then carries out a selection of multiple-choice questions in which the grade of the relevant player and the level (degree of difficulty) of the multiple-choice question are associated, and determines whether multiple-choice questions among the selected questions are already questions or unanswered questions, then transmits to the client terminal device 1 being played by the relevant player a tabulated content in regard to an already answered portion and a selected multiple-choice question in regard to an unanswered portion. Furthermore, the multiple-choice question management unit 361g executes a tabulating process on each selected result in regard to answers returned from each client terminal device 1. In the present embodiment, the ranks of multiple-choice questions are classified into a predetermined number of grades, here classified into three ranks being an initial level, an intermediate level, and an advanced level, and the grade of the player is associated with these three ranks (answerer levels). It should be noted that in addition to a method in which answer level information is set by the center server device 3 referencing the grade storage unit 362b, an embodiments are also possible in which answerer level information is not held in the individual card, or where grade information is held in the individual card, then a conversion is performed to an answerer level from the grade information read by the client terminal device 1, then transmitted to the center server device.

Hereinafter description is given first regarding processing of a mahjong game, after which description is given regarding processing of a multiple-choice question game.

Figure 9:
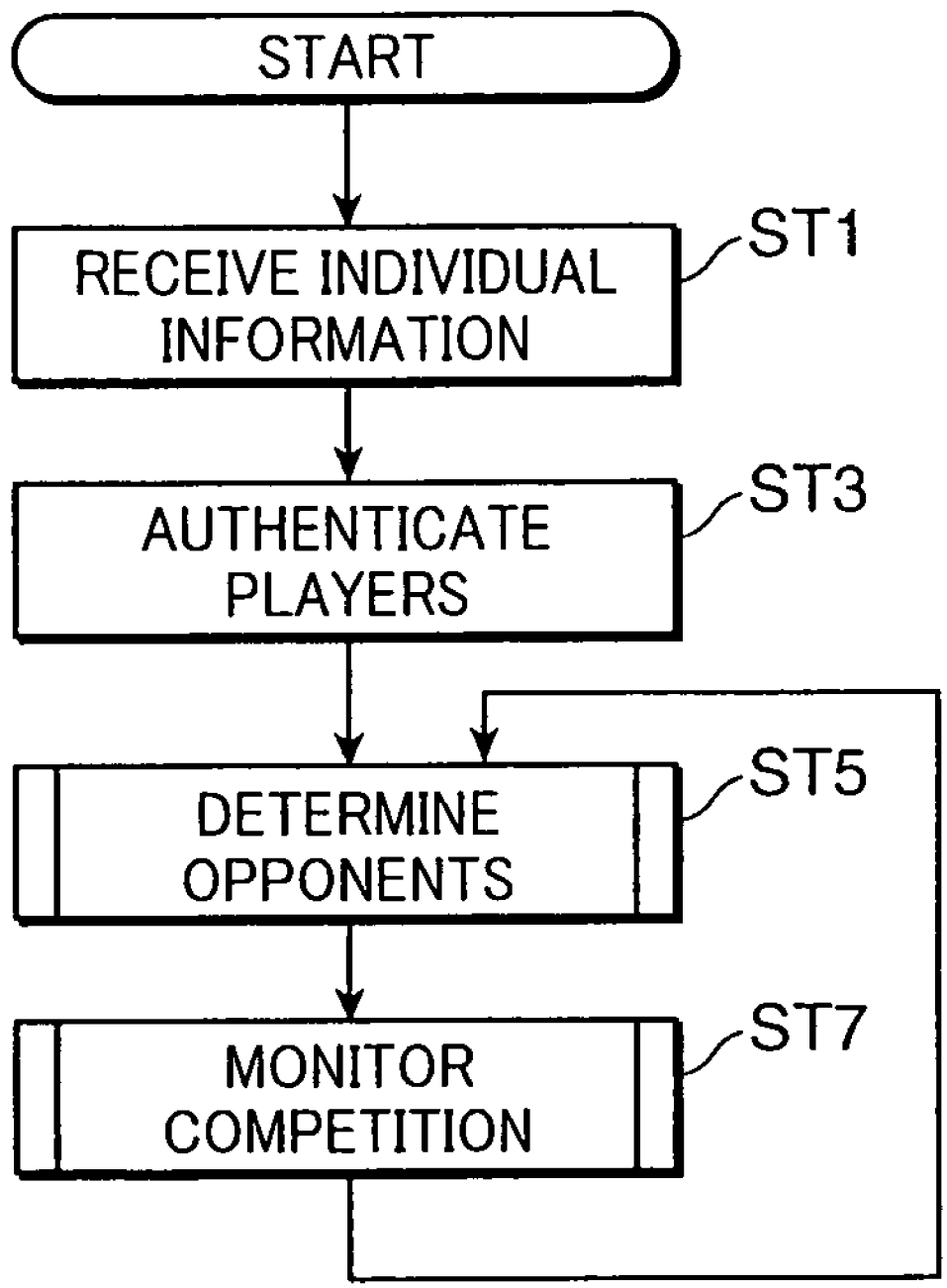
FIG. 9 is one example of a flowchart indicating operations of the center server device.

FIG. 9 is one example of a flowchart indicating operations of the center server device 3. First, individual information transmitted from the client terminal devices 1 is received by the reception unit 361a (step ST1), then a player authentication process is executed based on the player information stored in the player information storage unit 362a, and participation into the game is permitted once affirmed (step ST3). After this, based on the class stored in the grade storage unit 362b and the designation stored in the designation storage unit 363c, two or more players to play in the same game space are selected by the selection unit 361b from among players whose participation has been received and permitted by the reception unit 361a (received where "single player" mode, which is described later, is not the case), and instruction information to the effect that the players selected by the selection unit 361b are to execute a game in the same game space according to the first execution unit 361d is transmitted to the client terminal devices 1 to be used by the selected players (step ST5). It should be noted that monitoring of the operational status and the like of all the client terminal devices 1 executing the game according to the first execution unit 361d is carried out by the information processing unit 361 (step ST7).

Figure 10:
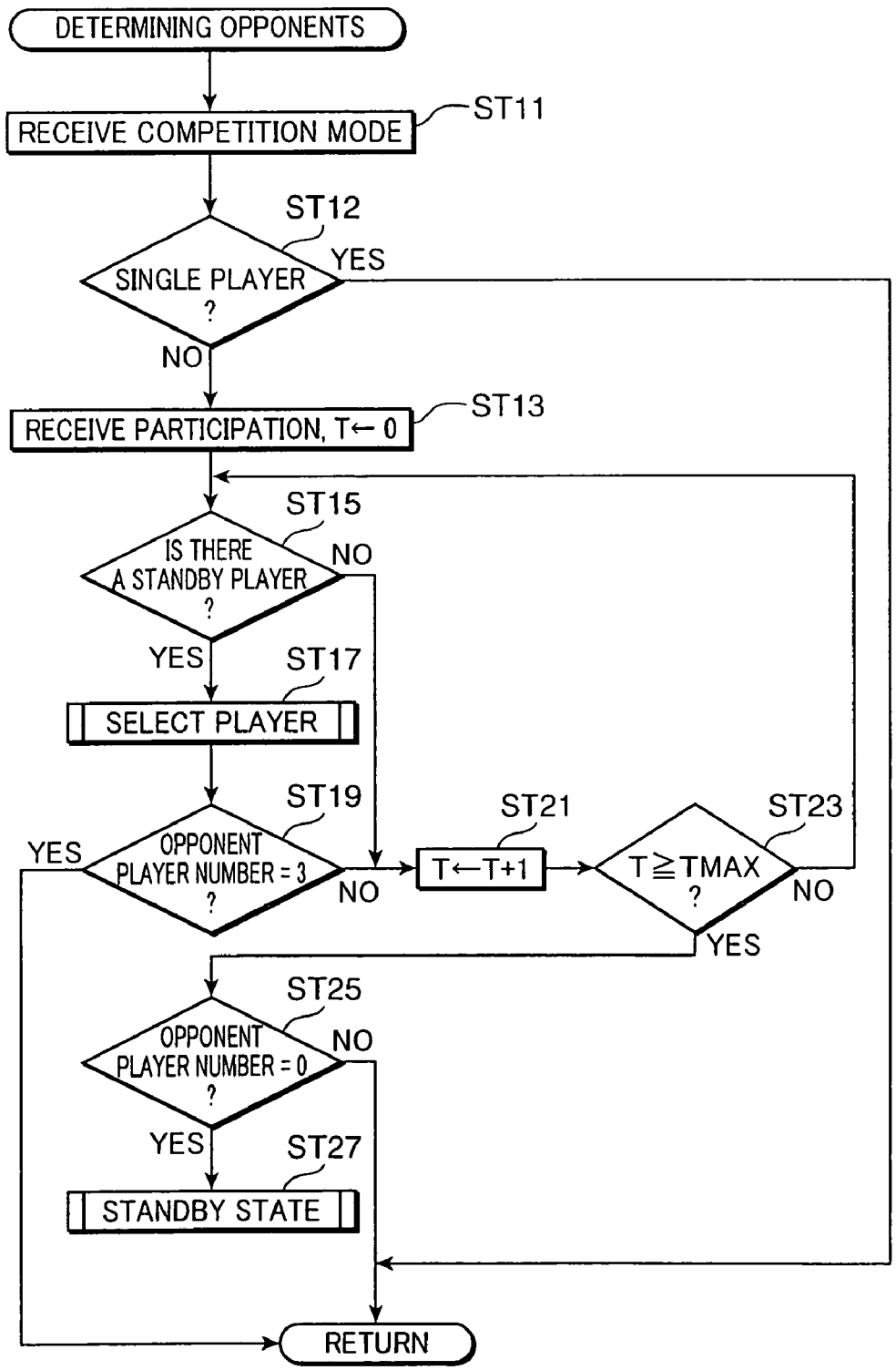
FIG. 10 is one example of a detailed flowchart of a process of determining opponents shown in FIG. 9.

FIG. 10 is one example of a detailed flowchart of step ST5 (process of determining opponents) shown in FIG. 9. It should be noted that unless stated otherwise, the following processing is carried out by the selection unit 361b. First, a competition mode sent from the client terminal device 1 is received by the reception unit 361a (step ST11). There are three competition modes, "single player," "in-store competition," and "network competition." The "single player" mode is a mode competing against a CPU player, the "in-store competition" mode is a competition mode when all the competitors are using client terminal devices 1 connected to the same store server 2, and the "network competition" is a competition mode when at least one player among the competitors is a player using a client terminal device 1 connected to a different store server.

Following this, a determination is carried out by the reception unit 361*a* as to whether or not the competition mode is the "single player" mode (step ST12). The processing returns when this determination is affirmative. When the determination is negative, the player is received, the time counter T is initialized to zero (step ST13) and instruction information is transmitted to the client terminal device 1 of the player that is playing so that a waiting screen shown in FIG. 11 is displayed.

Figure 11:
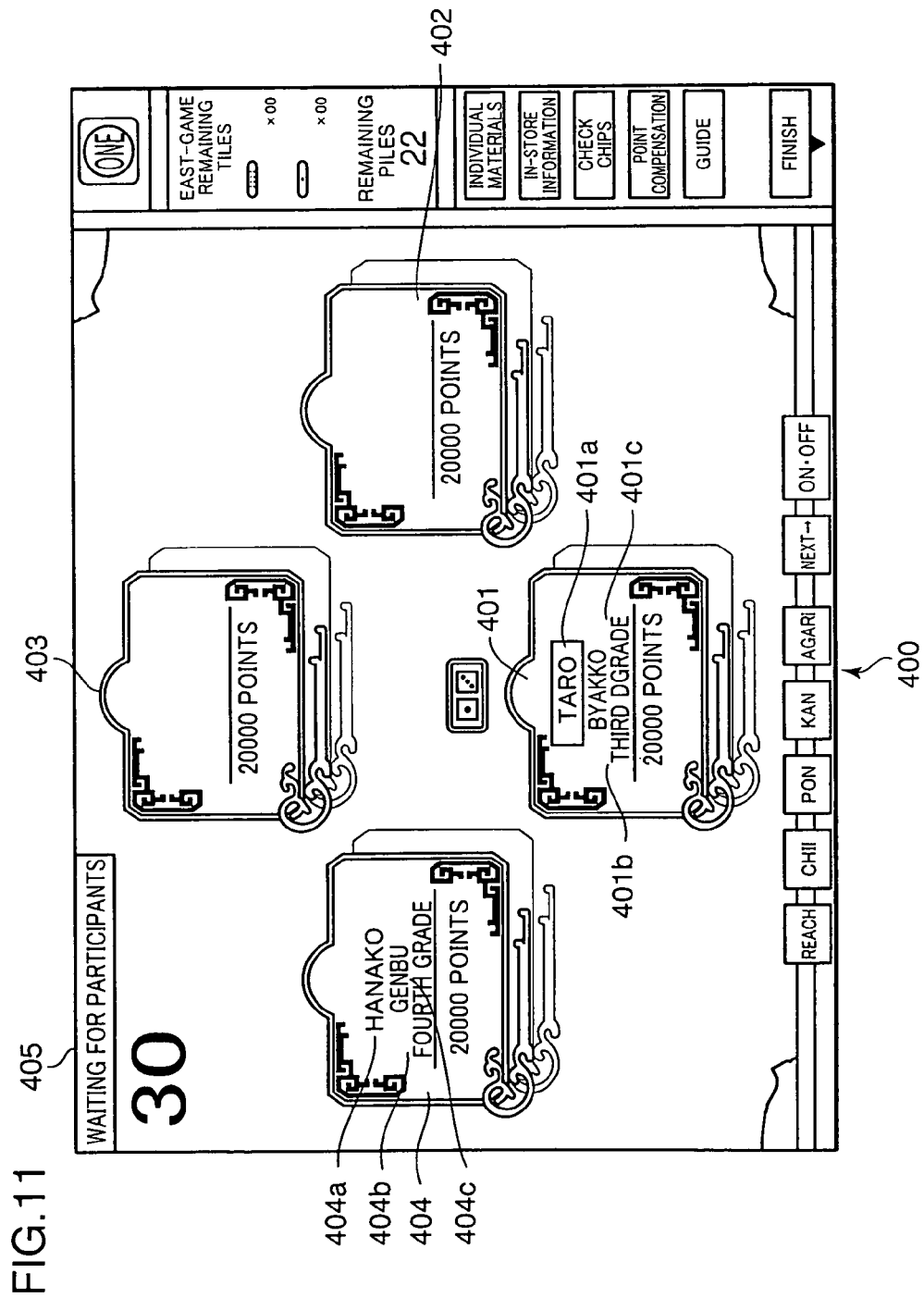
FIG. 11 is one example of a screen diagram of a waiting screen.

FIG. 11 is one example of a screen diagram of a waiting screen. In a waiting screen 400, player information 401 of the player to whom this screen is being displayed is displayed on a lower side of the screen, and player information 402 and 403 indicating that opponents are not selected is displayed on an upper side and right side of the screen, and player information 404 of the CPU player is displayed on the left side of the screen. The player information 401 and 404 displays names 401*a* and 404*a*, which are namings of the players in the game, player designations 401*b* and 404*b*, and player grades 401*c* and 404*c*. For example, the CPU player name is "Hanako," the designation is "Genbu," and the grade is "fourth grade." The waiting screen 400 does not display player information 402 and 403 of the opponents other than the player using the client terminal device 1 on which this screen is displayed and the CPU player, and therefore this player can confirm that opponents are not selected.

Description is given returning again to the flowchart shown in FIG. 10. A determination is carried out as to whether or not there is player who has been put into the standby state by the standby unit 361*c* or a player who has been received already (step ST15). The procedure proceeds to step ST21 when this determination is negative. When this determination is affirmative, two or more or three or less players who are to play in the same game space from among received players and players who have been put into a standby state by the standby unit 361*c* are selected (step ST17) based on the classes stored in the grade storage unit 362*b* and the designations stored in the designation storage unit 363*c*, then instruction information is transmitted to the client terminal device 1 being played by the player so that a waiting screen indicating the selected result is displayed.

Figure 12:
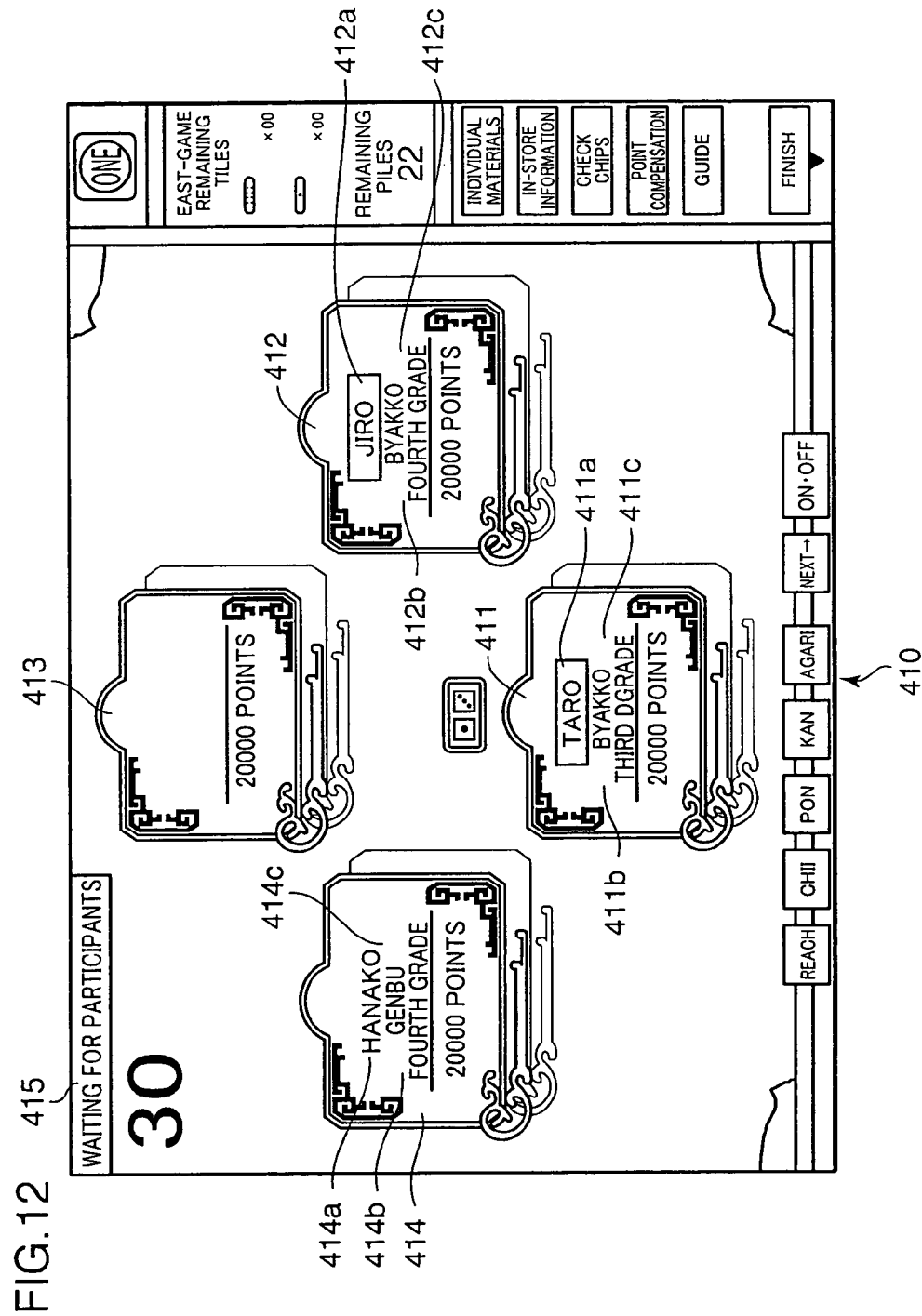
FIG. 12 is one example of a waiting screen indicating a selected result.

FIG. 12 is one example of a waiting screen indicating a selected result. In a waiting screen 410, player information 411 of the player to whom this screen is being displayed is displayed on the lower side of the screen, player information 413 indicating that an opponent is not selected is displayed on the upper side of the screen, player information 414 of the CPU player is displayed on the left side of the screen, and player information 412 of the player selected by the selection unit 361*b* is displayed on the right side of the screen. The player information 411, 412, and 414 displays names 411*a*, 412*a*, and 414*a*, which are namings of the players in the game, player designations 411*b*, 412*b*, and 414*b*, and player grades 411*c*, 412*c*, and 414*c*. In addition to the player using the client terminal device 1 on which this screen is displayed and the CPU player, the waiting screen 410 displays player information 412 of the player (opponent) selected by the selection unit 361*b*, and therefore the player using the client terminal device 1 on which this screen is displayed can confirm that one opponent has been selected.

Description is given returning again to the flowchart shown in FIG. 10. A determination is carried out as to whether or not the number of players (number of opponents) selected at step ST17 is three (step ST19). The processing returns when this determination is affirmative. When this determination is negative, the time counter T is incremented (step ST21), and a determination is carried out as to whether or not the time counter T is a predetermined time TMAX (here, 30 seconds) or greater (step ST23). The procedure returns to step ST15 when this determination is negative. When this determination is affirmative, a determination is carried out as to whether or not the number of players chosen at step ST17 is zero (that is, whether none were selected) (step ST25). When this determination is affirmative, the player is put into a standby state by the standby unit 361*c* (step ST27). The processing returns when this determination is negative.

Figure 13:
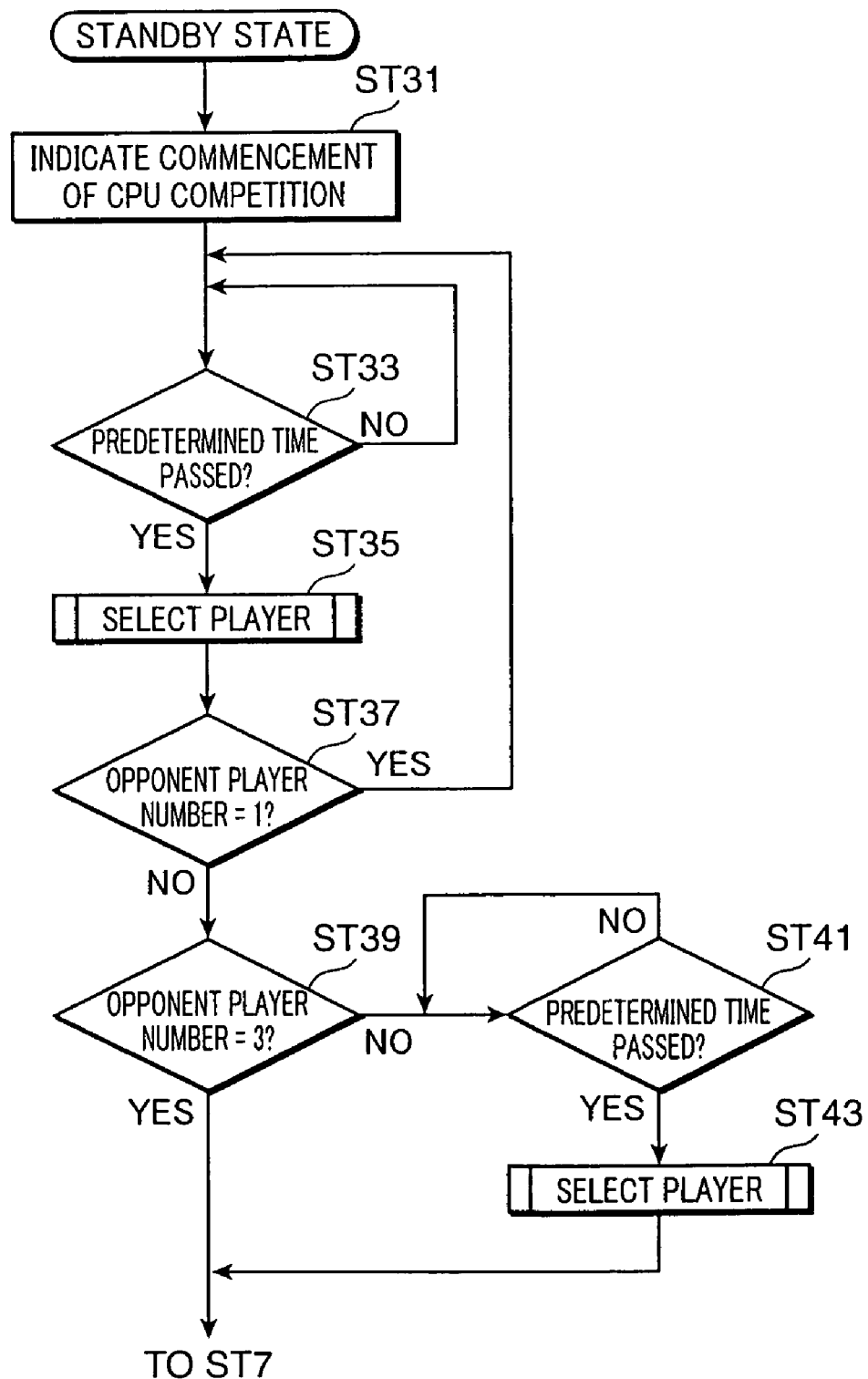
FIG. 13 is one example of a detailed flowchart of processing a standby state shown in FIG. 10.

FIG. 13 is one example of a detailed flowchart of processing (standby state processing) of step ST27 shown in FIG. 10. First, instruction information is transmitted to the client terminal device 1 to commence a CPU competition (a competition with only the CPU player) (step ST31).

Following this, a determination is carried out as to whether or not the predetermined time (for example, 30 seconds) has passed (step ST33), and the passing time is counted up until this determination is affirmed. When this determination is affirmative, player selection is carried out by the selection unit 361*b* (step ST35), then a determination is carried out as to whether or not the player who has been put into a standby state has been selected (step ST37). When this determination is affirmed, the procedure proceeds to step ST39 in which instruction information is transmitted to the client terminal device 1 so that a screen of appearing opponents is displayed that indicates that players have been selected. The procedure returns to step ST33 when this determination is negative.

When the determination of step ST37 is affirmative, a determination is carried out as to whether or not the number of players selected is three (step ST39). The procedure proceeds to step ST7 of FIG. 11 (process of monitoring competition) when this determination is affirmative. When this determination is negative (when the number of selected players is one), a determination is carried out as to whether or not a predetermined time (for example, 10 seconds) has passed (step ST41), and the passing time is counted up until this determination is affirmed. When this determination has been affirmed, player selection is carried out by the selection unit 361*b* (step ST43), then the procedure proceeds to step ST7 of FIG. 9 (process of monitoring competition).

Figure 14:
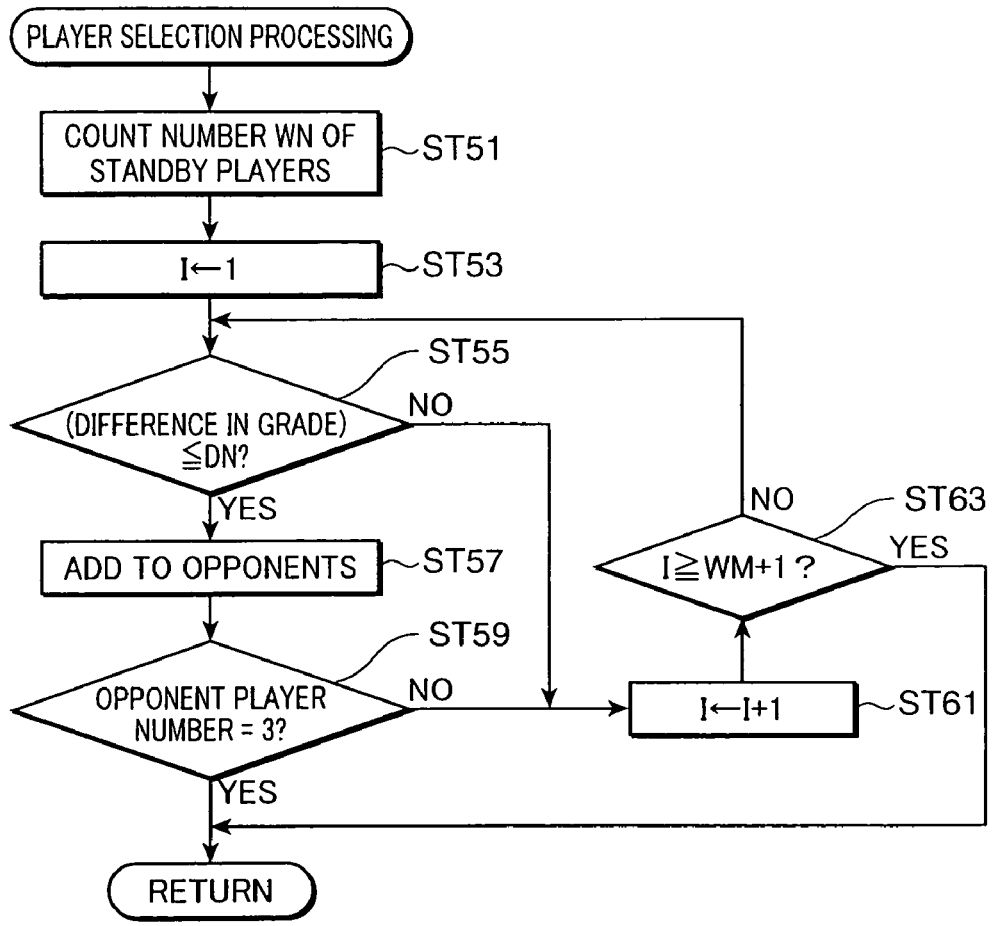
FIG. 14 is one example of a detailed flowchart of a player selection process shown in FIG. 10.

FIG. 14 is one example of a detailed flowchart of processing (player selection processing) of step ST17 shown in FIG. 10. It should be noted that the processing of step ST17 shown in FIG. 10 is the same processing as step ST35 and step ST43 shown FIG. 13. Furthermore, the following processes are all carried out by the selection unit 361*b*. First, a total number WN of standby players and received players is counted (step ST51), then a player number counter I is initialized to one (step ST53). Following this, the grades of this player and the I-number player are read in from the grade storage unit 362*b*, and a determination is performed as to whether or not the difference in grade is a predetermined value DN (here, two) or less (step ST55). The procedure proceeds to step ST61 when this determination is negative. When this determination is affirmative, the I-number player is added to the players to compete with the relevant player (step ST57).

Next, a determination is carried out as to whether or not the number of players to compete with the relevant player is three (step ST59). The processing returns when this determination is affirmative. When this determination is negative, the player number counter I is incremented (step ST61), and a determination is carried out as to whether or not the player number counter I has exceeded the player total number WN (step ST63). Processing returns when this determination is affirmative, and returns to step ST55 when it is negative.

Figure 15:
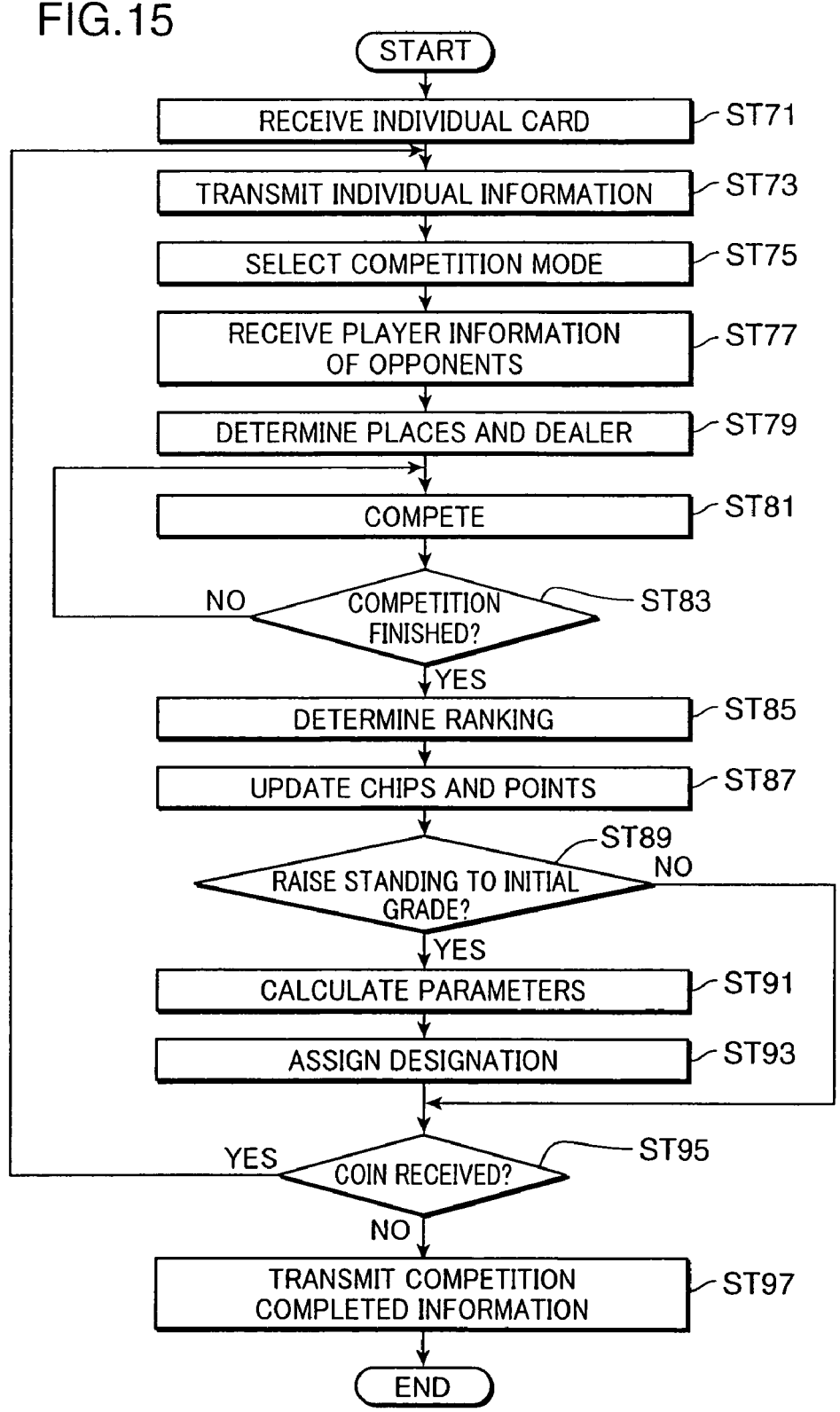
FIG. 15 is one example of a flowchart indicating operations of the client terminal device.

Here, description is given regarding operations of the client terminal device 1, which are executed based on instructions of the above-described center server device 3. FIG. 15 is one example of a flowchart indicating operations of the client terminal device 1. First, user ID data is read in from the individual card inserted into the card reader 13 (step S71), then the user ID data is transmitted to the center server device 3 (step ST73). Then, a mode selection screen for selecting the competition mode is displayed, input from the player is received and the competition mode is selected (step ST75), and competition mode information is transmitted to the center server device 3. Opponent information such as name, grade, and designation of other players (opponents) to carry out the game in the same game space is received from the center server device 3 (step ST77). Next, when instruction information to the effect that the game is to be executed is received from the center server device 3, game commencement processing is executed by the game development management unit 161a and the places and dealer are determined (step ST79), and further still the competition commences (step ST81) and a competition screen shown in FIG. 16 is displayed.

Figure 16:
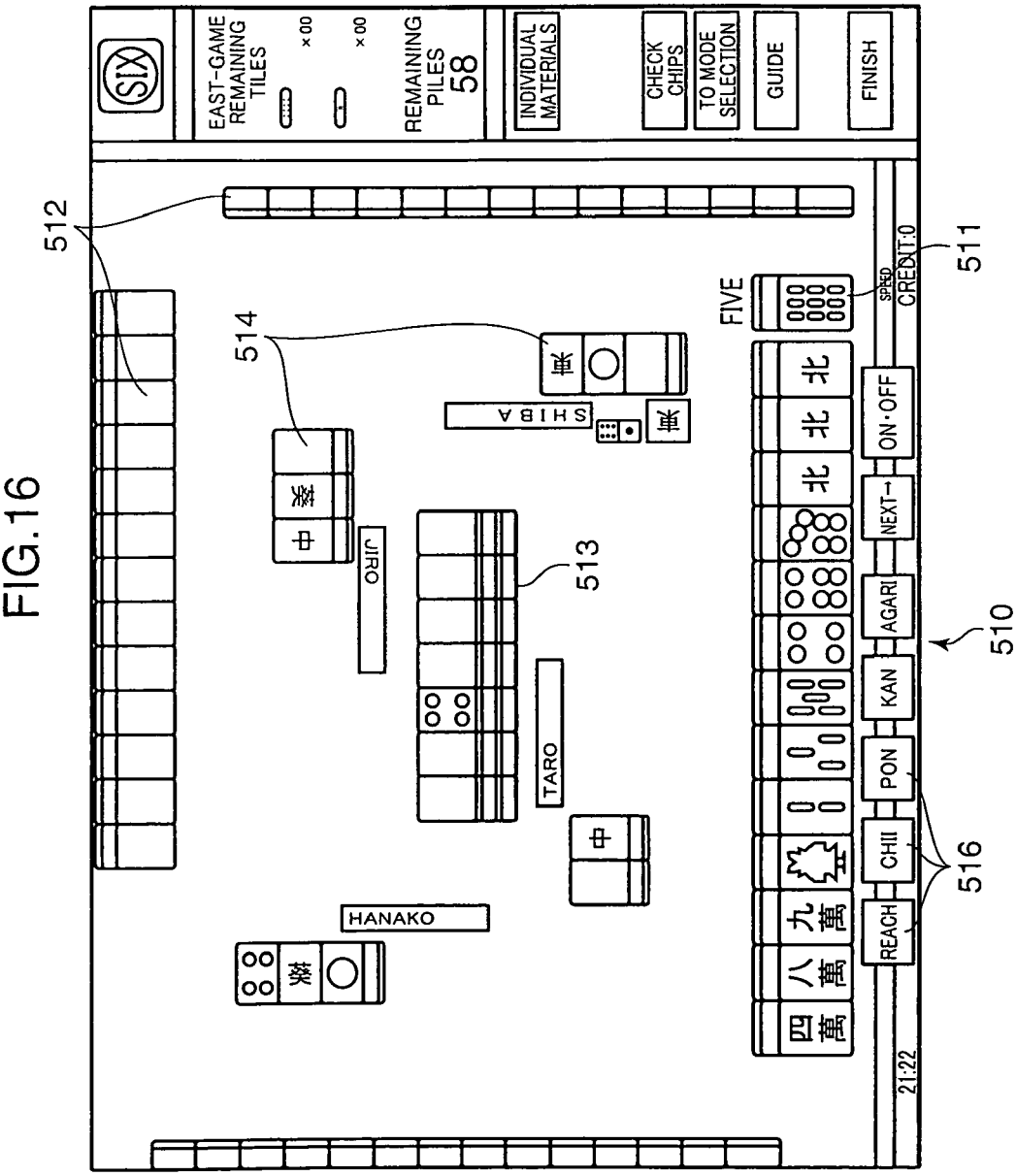
FIG. 16 is one example of a screen diagram of a competition screen indicating a competition status.

FIG. 16 is one example of a screen diagram of a competition screen indicating a competition status. In a competition screen 510, held-tiles 511 of the player are displayed at the lower side of the screen so that the types of tiles are visible, held-tiles 512 of the opponents are displayed at the upper side and left and right sides of the screen so that the types of tiles are visible, a draw pile 513 including displayed lucky tiles and discarded tiles 514 around the draw pile 513 are displayed substantially in the middle of the screen, and various buttons 516 to be pressed by the player are displayed on the lower side of the screen. The game advances by the player pressing the buttons 516 as required while observing the competition screen 510.

Description is given returning again to the flowchart shown in FIG. 15. After the competition has commenced, a determination is carried out by the game development management unit 161a as to whether or not the competition is finished (step S83). The procedure returns to step ST81 when this determination is negative. When the determination is affirmative, competition completion information indicating that the competition has finished is transmitted to the center server device 3 and the rankings in the game are determined by the result determination unit 161e (step ST85). Then, items virtually held by the players are transferred among the players by the item transferring unit 161f based on the determination result of the result determination unit 161e and the number of games played (step ST87). Following this, based on the number of items and points virtually held by the player, a grade indicating a level of strength of the player in the game is determined by the grade determining unit 161g, and by comparing this with the grade that had been stored in the grade storage unit 162a up until now (at the time of completion of the previous game), a determination is carried out as to whether or not the grade is to be changed to the initial grade (step ST89). In a case where the grade is not to be changed to the initial grade, an item display screen not shown in the diagram that indicates the current number of items and the like is displayed, and the procedure proceeds to step ST95. It should be noted that the grade determined by the grade determining unit 161g is stored in the grade storage unit 162a and also transmitted to the center server device 3 as grade information.

In a case where the grade is to be changed to the initial grade, a designation parameter is calculated by the designation parameter calculation unit 161h indicating a feature of the player in the game (step ST91). Then, based on the designation parameters calculated by the designation parameter calculation unit 161h, a designation of the player in the game is virtually assigned to the player by the designation assigning unit 161i (step ST93), and designation information is then stored in the designation storage unit 162c and also transmitted to the center server device 3.

Although not shown in the diagram, when the processing of step ST93 is executed, continuation of the game is guided by an image or by audio for players who clear a predetermined condition, and a determination is carried out as to whether or not the game is to be continued due to reception of this guiding and reception of a determination from the player according to whether or not a coin has been received by the coin receiving unit 14 (step ST95). The procedure returns to step ST97 when this determination is affirmative, and proceeds to step ST73 when the determination is negative.

When the determination of step ST95 is negative, competition information indicating that the game is finished is transmitted to the center server device 3 (step ST97) and processing finishes.

Hereinafter, description is given regarding processing of a multiple-choice question game. FIG. 17 is a diagram showing one example of a table map of a database that constitutes the multiple-choice question related information storage unit 362e.

This database is constituted by a required number of tables for appropriately structuring data, here tables 1 to 3. Table 1 is a region relating to data of a so-called "which tile will you discard" question, which is a multiple-choice question, and has various data items including a question ID that specifies the question, a question level (rank), question data, answer data of answers recommended by pros (in this situation a mahjong pro would discard this tile), an answer reception period for setting a time limit on answers, and a result display period for setting a time period in which tabulated results are distributed and notified. By setting a time limit on answers, the multiple-choice questions stored in the multiple-choice question related information storage unit 362e are changed to new questions (replaced) for each period (for example, one week; see FIG. 24). Table 2 is a region relating to player answers, and has various data items including player ID (user ID), question ID corresponding to answered multiple-choice questions, and answer results of the players. Table 3 is a region relating to tabulated data of the answers, and has various data items including question ID and number of people (player number) for each answer (in regard to the options). It should be noted that this data table is prepared with sufficient memory capacity for the numbers of necessary items in each table (number of questions in table 1, number of players who have answered in table 2, and number of answered questions in table 3).

Figure 18:
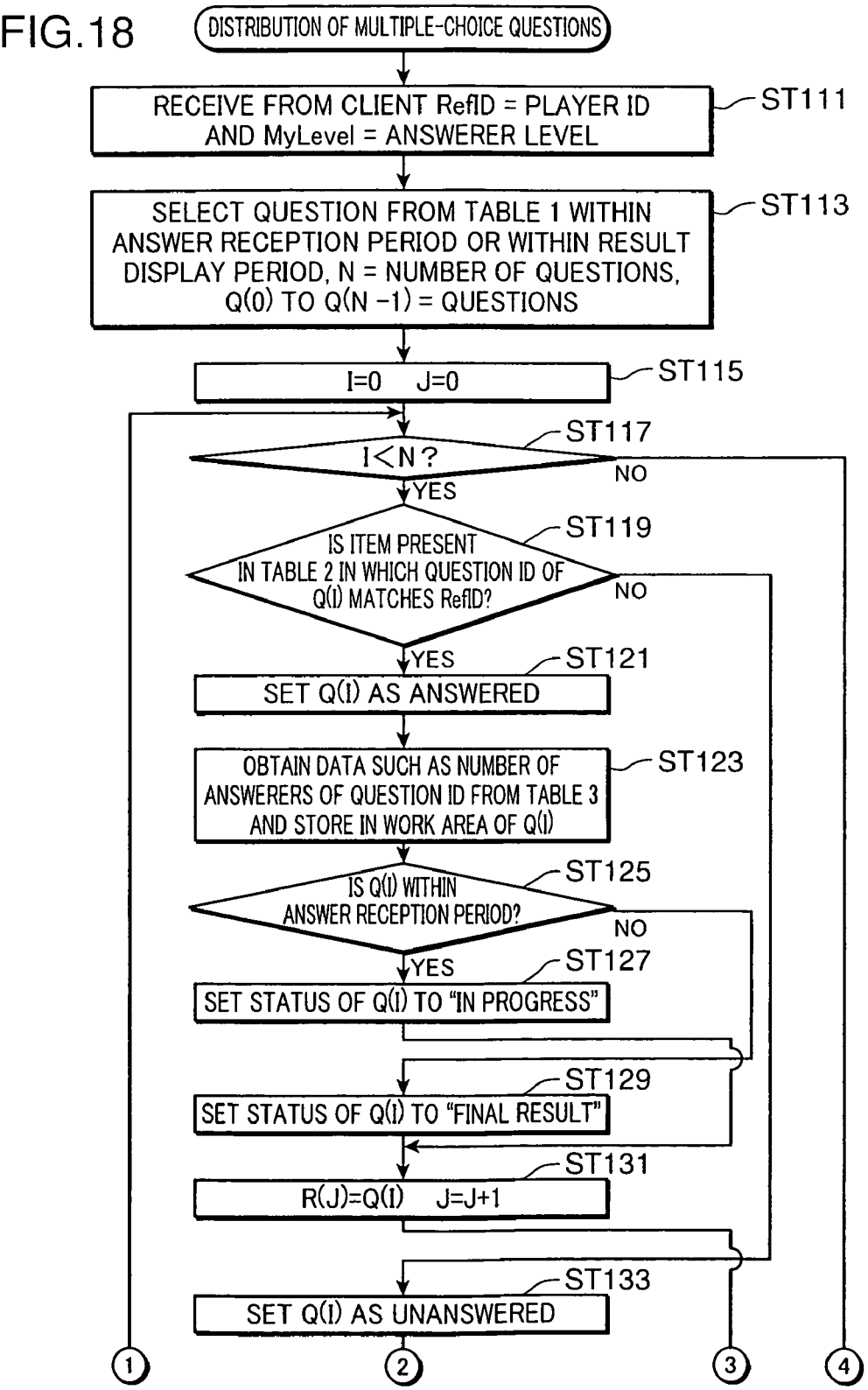
FIG. 18 is a flowchart showing one example of distribution processing of multiple-choice questions executed by the center server device.
Figure 19:
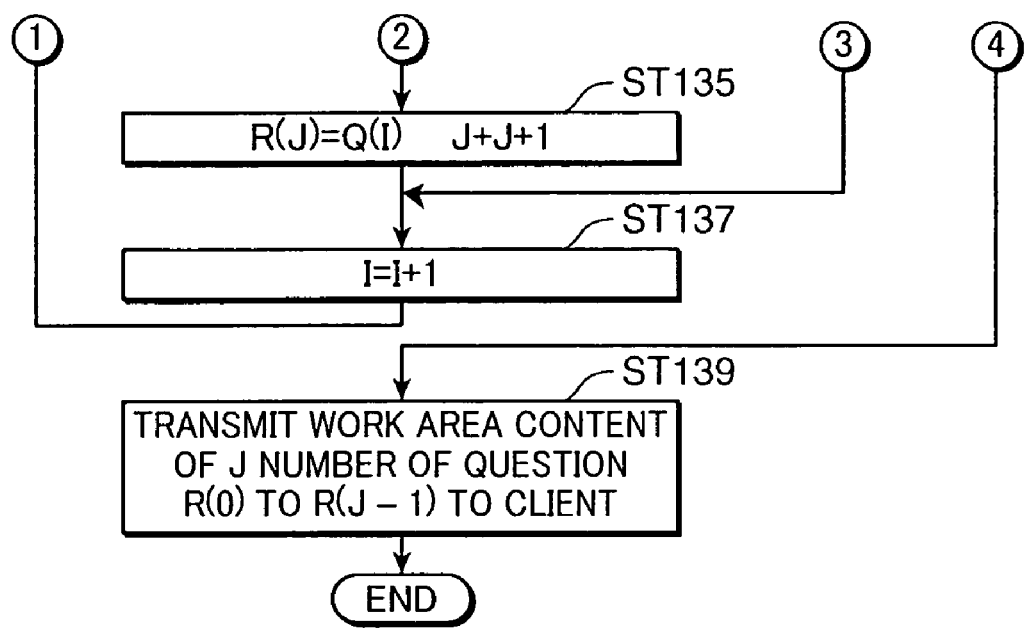
FIG. 19 is a flowchart showing one example of distribution processing of multiple-choice questions executed by the center server device.

FIG. 18 and FIG. 19 are flowcharts showing one example of distribution processing of multiple-choice questions executed by the center server device 3. First, reception is carried out of the player ID (RefID) and answerer level (MyLevel) from a certain client terminal device 1 (step ST111), then a number of questions (N) that satisfy conditions of the answer reception period item and result display period item of table 1 of the multiple-choice question related information storage unit 362e and question data (Q(I): I=0 to N−1) are selected as candidates (step ST113). When selection of candidates finishes, variable I and J both undergo an initial setting to a value of zero (step ST115), and first a determination is carried out as to whether or not I<N (step ST117). Initially I=0 and therefore it is the case that I<N and the procedure proceeds to step ST119, then a determination is performed as to whether or not there is agreement between the question ID of Q(I) (note that here I=0) and the RefID, which is the player ID in table 2, and when there is agreement, the question Q(I) of this time is assigned a flag as answered (already answered) (step ST121), then the procedure proceeds to step ST123. At step ST123, data such as the number of people of answers of the question ID is obtained from table 3 (including tabulated data) and stored in a work area of question Q(I).

Following this, a determination is performed as to whether or not the question Q(I) is within the answer reception period (step ST125), and if this is affirmative, an "in progress" flag is assigned to the question Q(I) (step ST127), and if this is negative, a "final result" flay is assigned to the question Q(I) (step ST129). In progress refers to tabulated results within the answer reception period, and final result refers to tabulated results of the entire answer reception period.

Next, at step ST131, R(J)=Q(I) and J=J+1 conversions are carried out and the procedure proceeds to step ST137. On the other hand, when the determination is negative at step ST119, an unanswered flag is assigned to the question Q(I) (step ST133), after which R(J)=Q(I) and J=J+1 conversions are carried out (step ST135). Next, I=I+1 is performed (step ST137), then the procedure returns to step ST117, and the same processing is repeated until question Q(N−1).

At step ST117, when the determination of I<N is negative, data stored (at step ST123) in the work area of a selected J number of questions R(0) to R(J−1) is returned to the client terminal device 1 (step ST139), and the present flow finishes.

Figure 20:
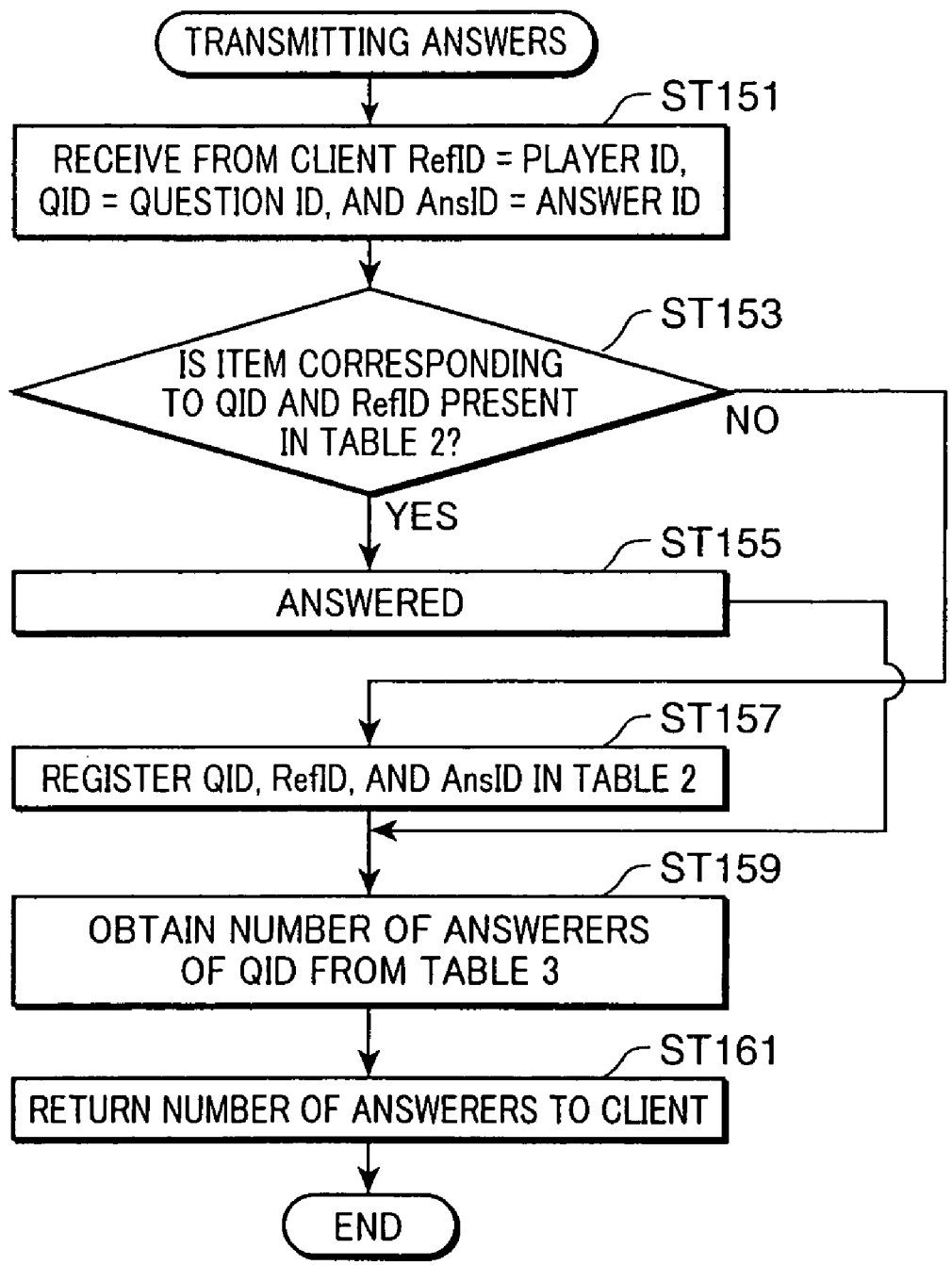
FIG. 20 is a flowchart showing one example of a process of transmitting answers to the client terminal device executed by the center server device.

FIG. 20 is a flowchart showing one example of a process of transmitting answers to the client terminal device 1 executed by the center server device 3. First, when reception from the client terminal device 1 is carried out of RefID, which is the player ID, QID, which is the question ID, and AnsID, which is the answer ID (step ST151), a determination is carried out as to whether or not data corresponding to the QID and RefID is present in table 2 (step ST153). When this determination is negative, the procedure proceeds to step ST157, but on the other hand, when this determination is affirmative, it is assumed this is already answered, and the procedure proceeds to step ST159. At step ST157, since the determination was unanswered, the QID, RefID, and AnsID are registered in table 2 (see FIG. 17), the procedure proceeds to step ST159.

At step ST159, the number of answerers of QID is obtained from table 3, and data of the obtained number of answerers is returned to the client terminal device 1 received at step ST151 (step ST161), and the present flow finishes.

Figure 21:
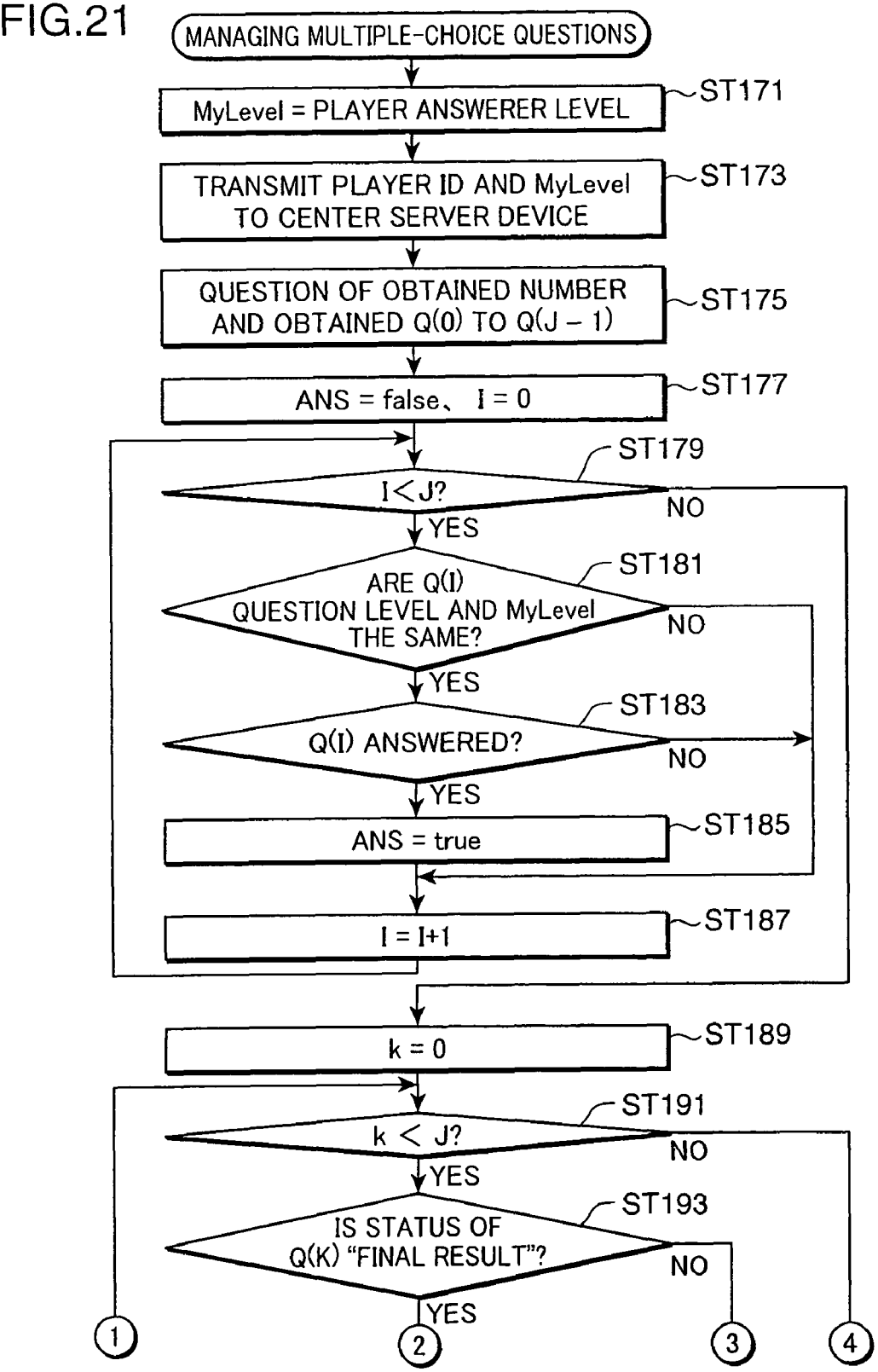
FIG. 21 is a flowchart showing one example of a management process of multiple-choice questions executed by the client terminal device.
Figure 22:
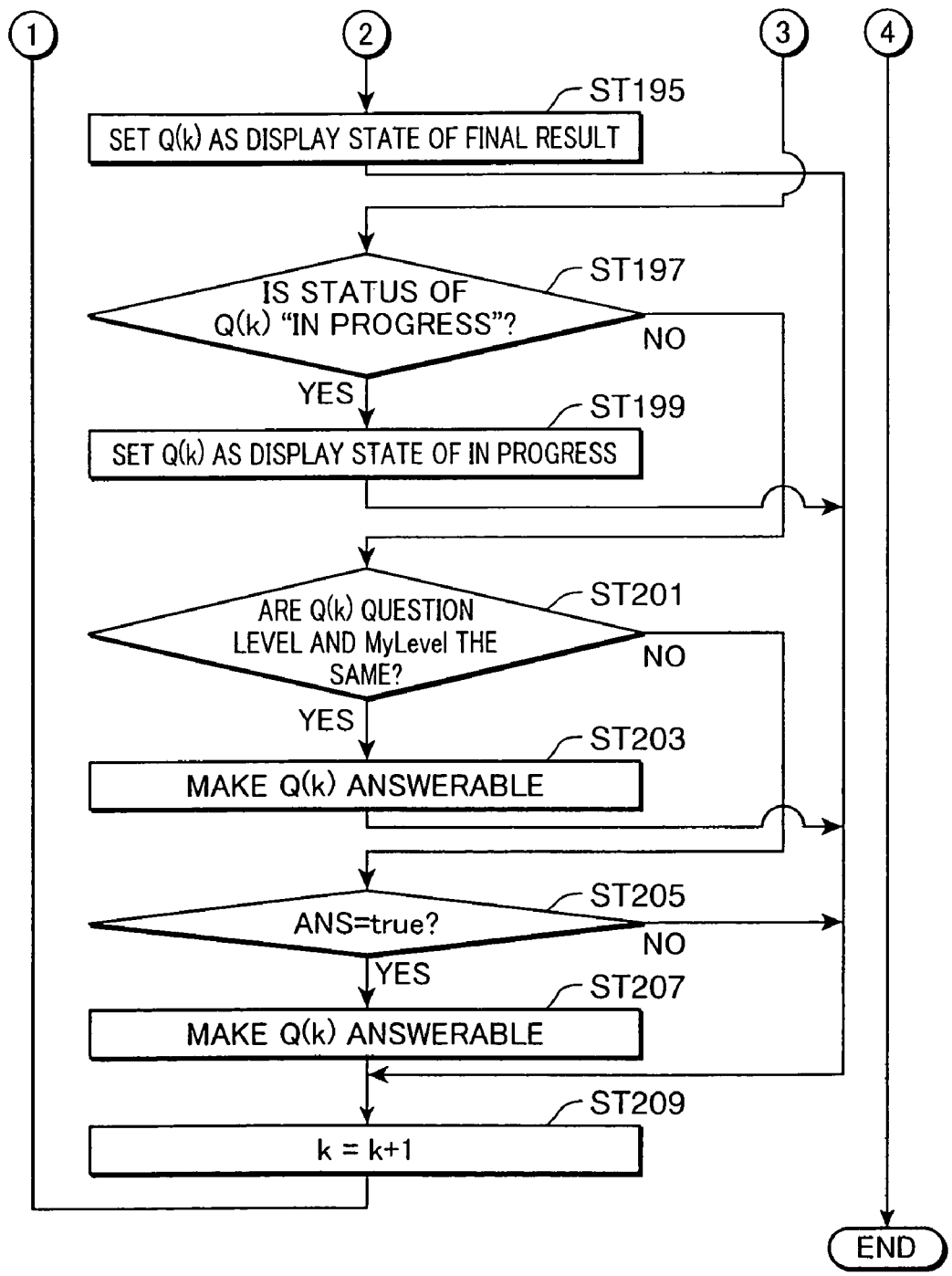
FIG. 22 is a flowchart showing one example of a management process of multiple-choice questions executed by the client terminal device.

FIG. 21 and FIG. 22 are flowcharts showing one example of management processing of multiple-choice questions executed by the client terminal device 1.

First, the individual card is inserted into the card reader 13, and information MyLevel of the answerer level in the individual information of the player is obtained (step ST171), then the player ID and the answerer level MyLevel are transmitted to the center server device 3 (step ST173). That is, the embodiment here is one in which the answerer level is stored in the individual card.

Following this, when reception is carried out of a J number of question information sets sent from the center server device 3 at step ST139 (step ST175), a process is executed hereinafter of confirming a display state of the questions. It should be noted that here the multiple-choice questions are expressed as Q.

First, variables ANS=false and I=0 are set (step ST177). Here, ANS=false indicates that a multiple-choice question of a level corresponding to the answerer level is in an unanswered state, and ANS=true indicates that it is an already solved state.

Following this, a determination is carried out as to whether or not I<J (step ST179). Initially I=0 and therefore it is the case that I<J and the procedure proceeds to step ST181, then a determination is performed as to whether or not the question level of Q(I) (note that here I=0) and MyLevel are the same, and if this is affirmative, next a determination is carried out as to whether or not this Q(I) is answered (step ST183). If the relevant Q(I) is answered, the procedure proceeds to step ST185, and ANS=true is set. That is, this indicates that the question Q(I) of a same level as MyLevel is already answered. It should be noted that in the cases of NO at step ST181 or NO at step ST183, step ST185 is skipped (left answered as it is) and the procedure proceeds to step ST187.

Furthermore, in a case of YES at step ST181 and NO at step ST183, step ST185 is skipped, but a significance of this case is that an answer to a question of another level cannot be made unless a question Q of a same level as MyLevel is answered. For example, in a screen of FIG. 24, which supposes a case in which a player whose MyLevel is "intermediate level" is playing, as is described later, in a level display section 605, only the frame of "intermediate level questions" is displayed highlighted (in the diagram this is drawn as a bold border), which indicates to the player that currently answers are permitted for only "intermediate level questions."

At step ST187, I=I+1 is set, then the procedure returns to step ST179 and repeats the same processing. Then, at step ST179, when the determination of I<J is negative, a variable k=0 is set (step ST189), and a determination of whether k<J is carried out (step ST191).

When the determination of k<J is negative, a determination is performed as to whether or not the status of Q(k) is "final result" (step ST193), and when it is determined that the status of Q(k) is "final result," Q(k) is set to a display state of "final result" (step ST195) and the procedure proceeds to step ST209.

On the other hand, when it is determined that the status of Q(k) is not "final result," a determination is performed as to whether or not the status of Q(k) is "in progress" (step ST197). When it is determined that the status of Q(k) is "in progress," Q(k) is set to a display state of "in progress" (step ST199), and the procedure proceeds to step ST209.

On the other hand, when it is determined that the status of Q(k) is not "in progress" at step ST197, a determination is performed as to whether or not the question level of Q(k) and MyLevel are the same (step ST201). When it is determined that the question level of Q(k) and MyLevel are the same, Q(k) is set to an answerable state (step ST203), and the procedure proceeds to step ST209.

On the other hand, when it is determined that the question level of Q(k) and MyLevel are not the same, a determination is performed at to whether or not ANS=true (step ST205). When it is determined that the ANS=true, Q(k) is set to an answerable state (step ST207), and the procedure proceeds to step ST209. On the other hand, when it is determined that ANS=true is not the case, the procedure proceeds as it is to step ST209.

At step ST209, k=k+1 is set, then the procedure returns to step ST191 and repeats the same processing. Then, when the determination of k<J is negative, the present flow finishes.

Figure 23:
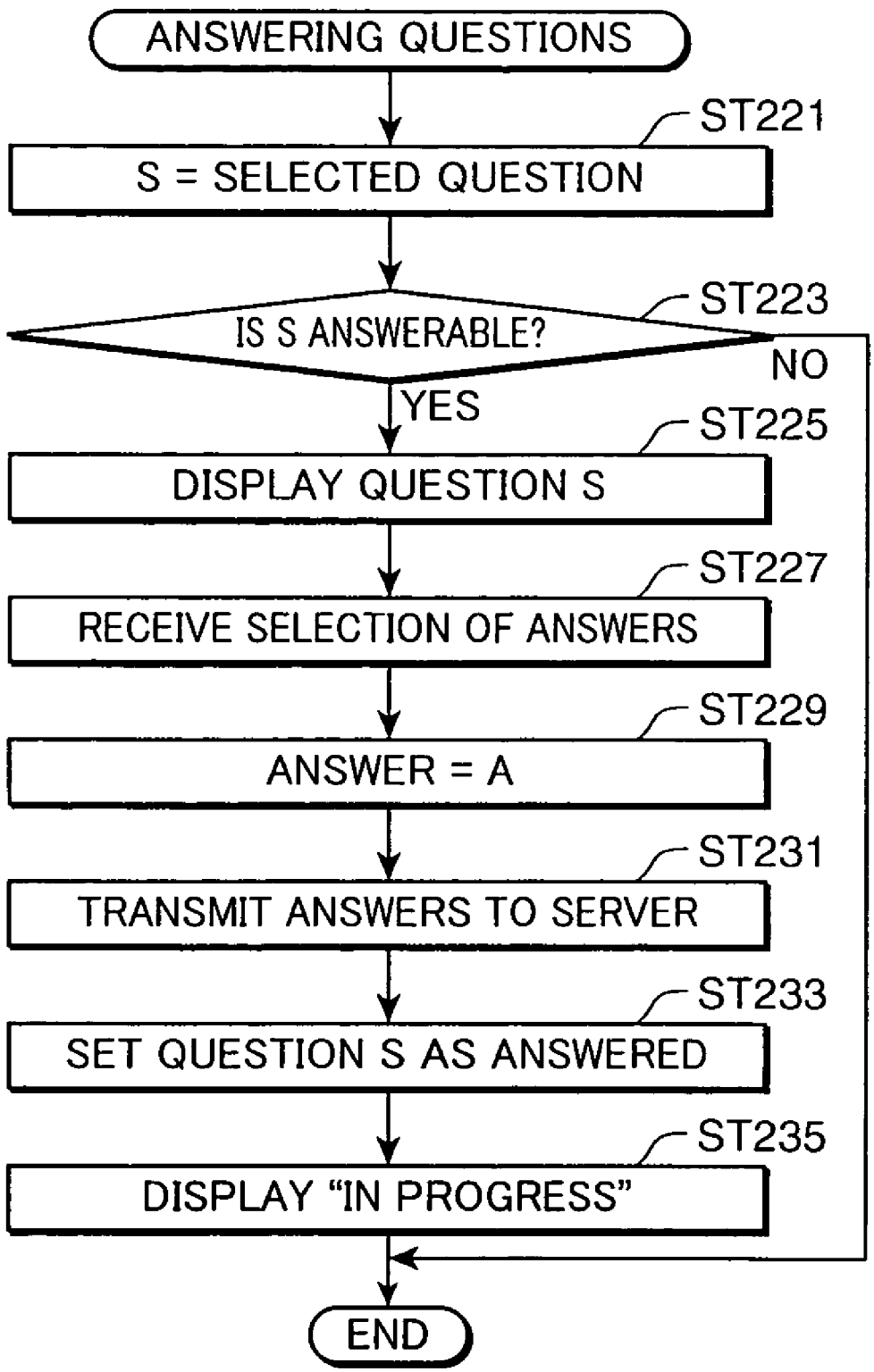
FIG. 23 is a flowchart showing one example of answer processing of multiple-choice questions executed by the client terminal device.

FIG. 23 is a flowchart showing one example of answer processing of multiple-choice questions executed by the client terminal device 1.

First, a variable S="selected question" is set (step ST221), then a determination is carried as to whether or not the selected question S is answerable (step ST223). If the selected question S is an answerable question, then this question S is displayed on the monitor 11 (step ST225), and selection of answers is made receivable (step ST227). Then, when an answer is received, answer=A is set (step ST229), the answer A is transmitted to the center server device 3 (step ST231), and an answered flag is assigned to the question S (step ST233). Next, tabulated results midway with respect to this question S transmitted from the center server device are displayed on the monitor 11 (step ST235), and the present flow finishes.

On the other hand, when it is determined at step ST223 that the question S is not an answerable question, the present flow finishes.

In the foregoing, steps ST177 to ST209 of FIGS. 21 and 22 are executed separately each time answers are received and answer=A is set (step ST229) and an answered flag is assigned to the relevant question S (step ST233). In this way, the status with respect to answer permissions and the like for each multiple-choice question is updated in response to answers at the client terminal device 1 side. Accordingly, the complexity involved in transmitting a new question from the center server device 3 each time a multiple-choice question is answered is eliminated.

Figure 24:
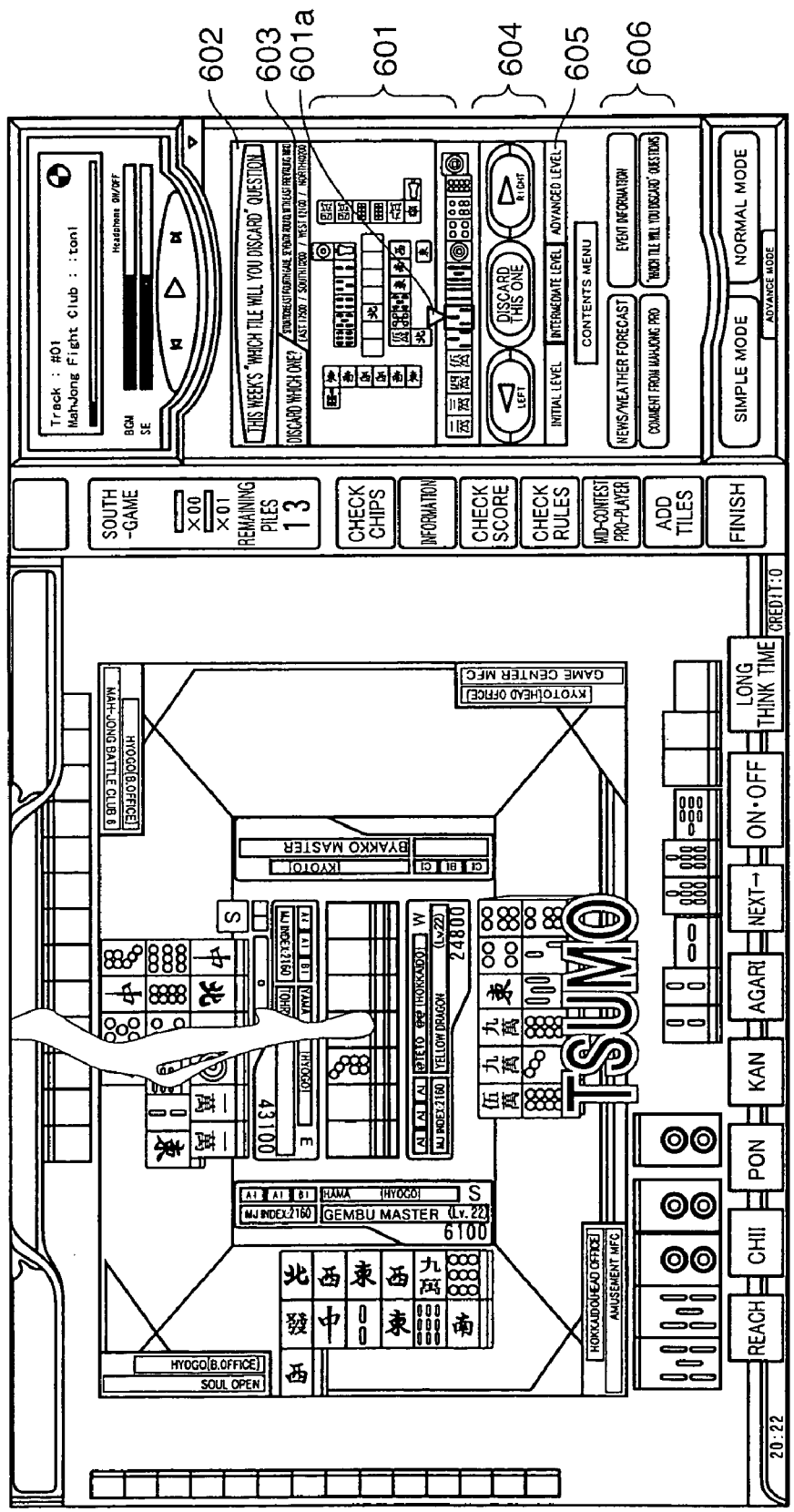
FIG. 24 is a display screen showing one example of a multiple-choice question.

FIG. 24 is a display screen showing one example of a multiple-choice question. A predetermined right side portion of the monitor 11 is a region 600 that displays multiple-choice question related images, and a display section 601 of multiple-choice questions is provided substantially central to the region 600, and a "which tile will you discard?" question display section 602 and a multiple-choice question status explanation section 603 are provided thereabove. Furthermore, an operational display section 604 having a button to specify a tile to discard and left and right buttons for changing the indication of tiles to the left and right thereof is displayed at a lower portion of the multiple-choice question display section 601. A level display section 605 displays buttons for selecting the levels of "initial level," "intermediate level," and "advanced level." In a distribution information display section 606, at least a "mahjong pro comment" button and a "which tile will you discard?" question button are displayed. In this example, "intermediate level" is selected corresponding to the answerer level, and the multiple-choice question display section 601 displays a case supposing one mid-game situation of an east fourth game, seventh round, with an east prevailing wind, and in which a "two manzu" tile is ready to be declared "tsumo" (the tile on the right edge of the tiles arranged in a left to right row at a lower portion of the multiple-choice question display section 601), a question is displayed prompting selection of which tile of the 14 held tiles to discard. An arrow mark 601a displayed on one portion of the held tiles is for making visible the tile to be discarded, and each time the left/right button is pressed, control of movement is performed to one tile left or right corresponding to the direction pressed.

Figure 25:
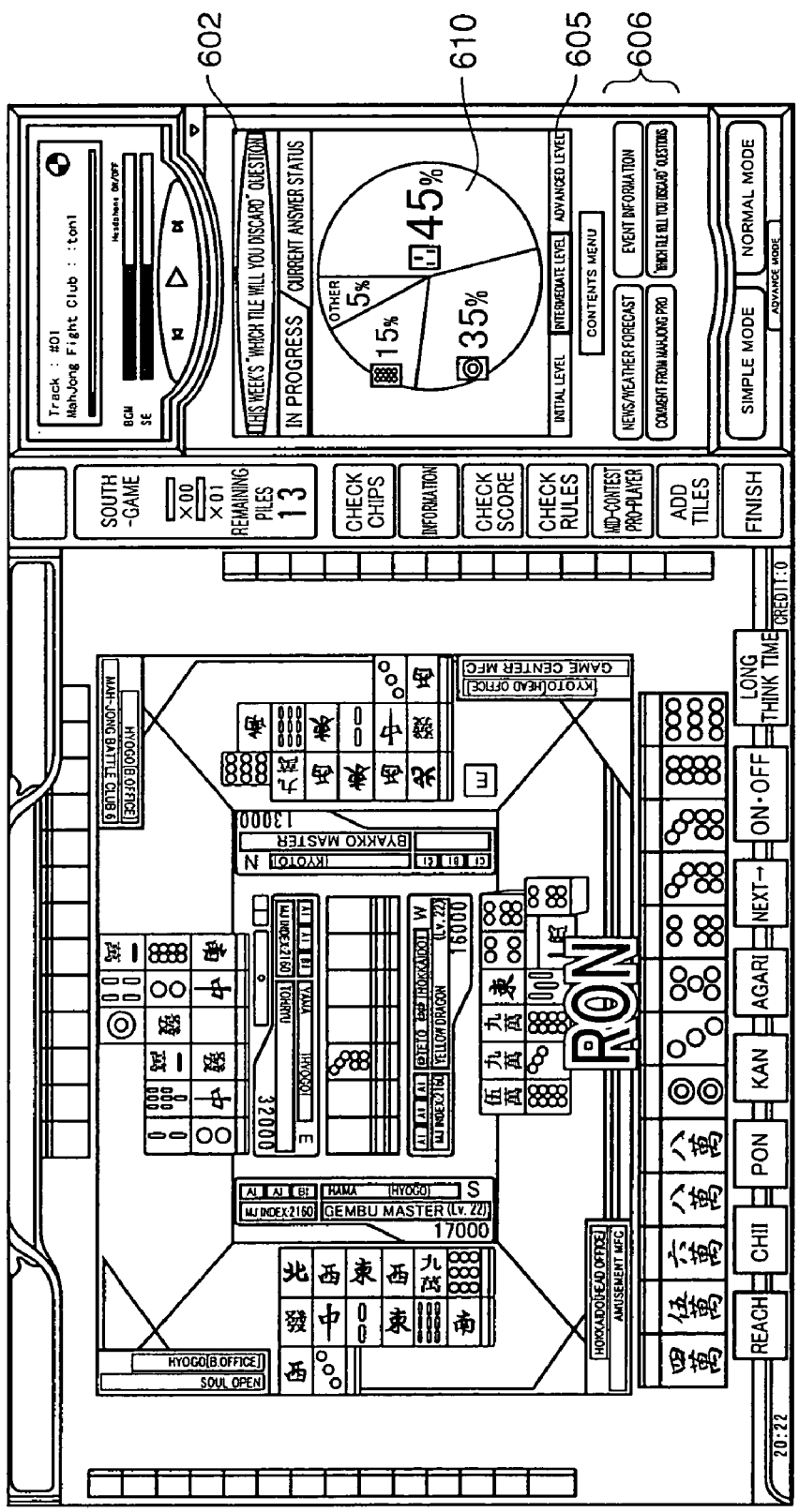
FIG. 25 is a display screen showing one example of tabulated results in a case where the multiple-choice question has been answered.

FIG. 25 is a display screen showing one example of tabulated results in a case where the multiple-choice question has been answered. The current answer status is displayed as "in progress" with a predetermined graph, here a circular graph 610, substantially central to the region 600, and tiles are displayed with numerical values, here percentages, in order of the highest selected in accordance with answer statuses from other client terminal devices 1.

Figure 26:
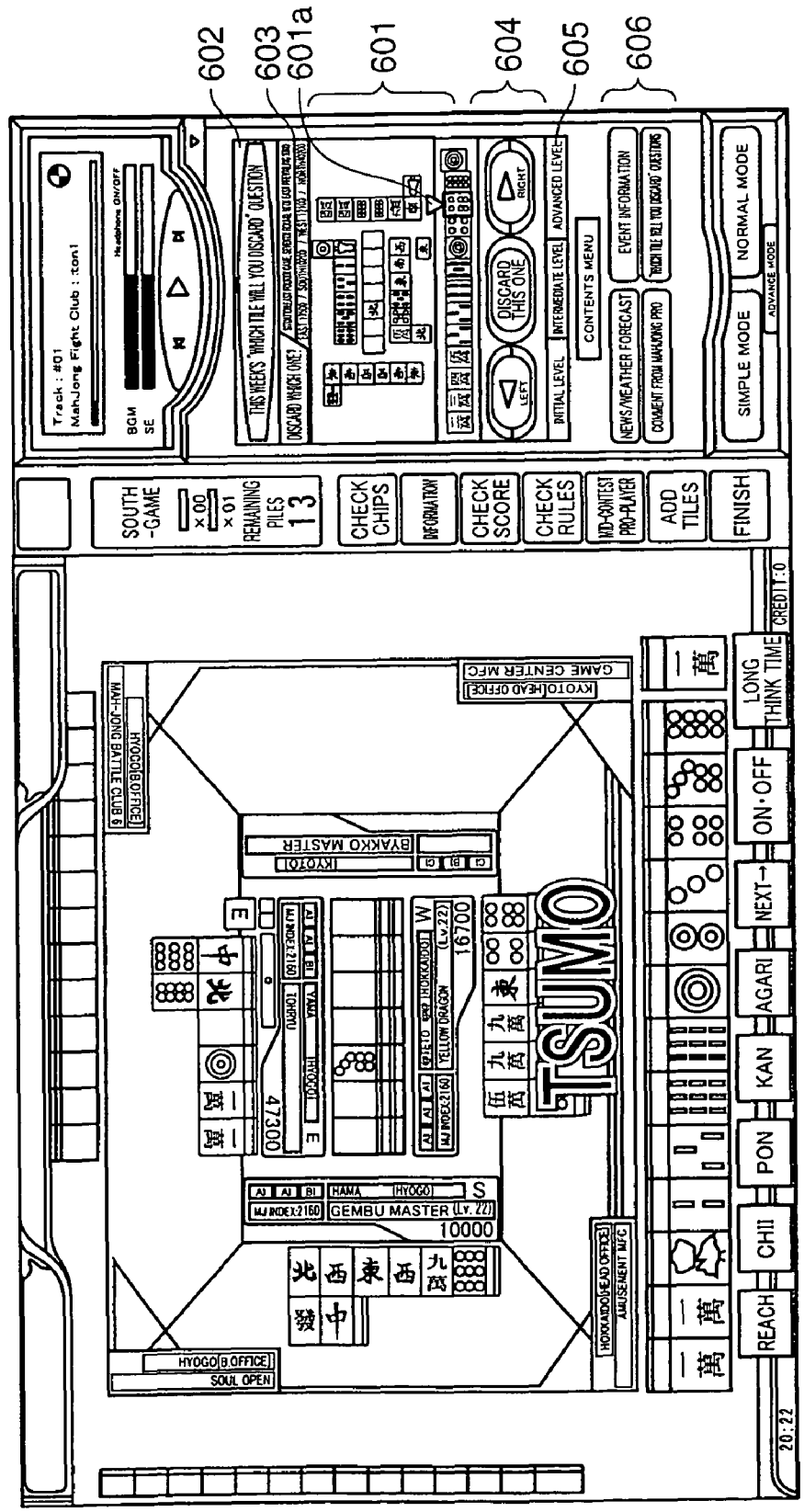
FIG. 26 is a display screen showing one example of a case where a question of another level has been selected when the question of the answerer level has been answered.

FIG. 26 is a screen showing one example of a case where a question of another level has been selected when the question of the answerer level has been answered. Here, a case is shown in which "initial level" has been selected.

Figure 27:
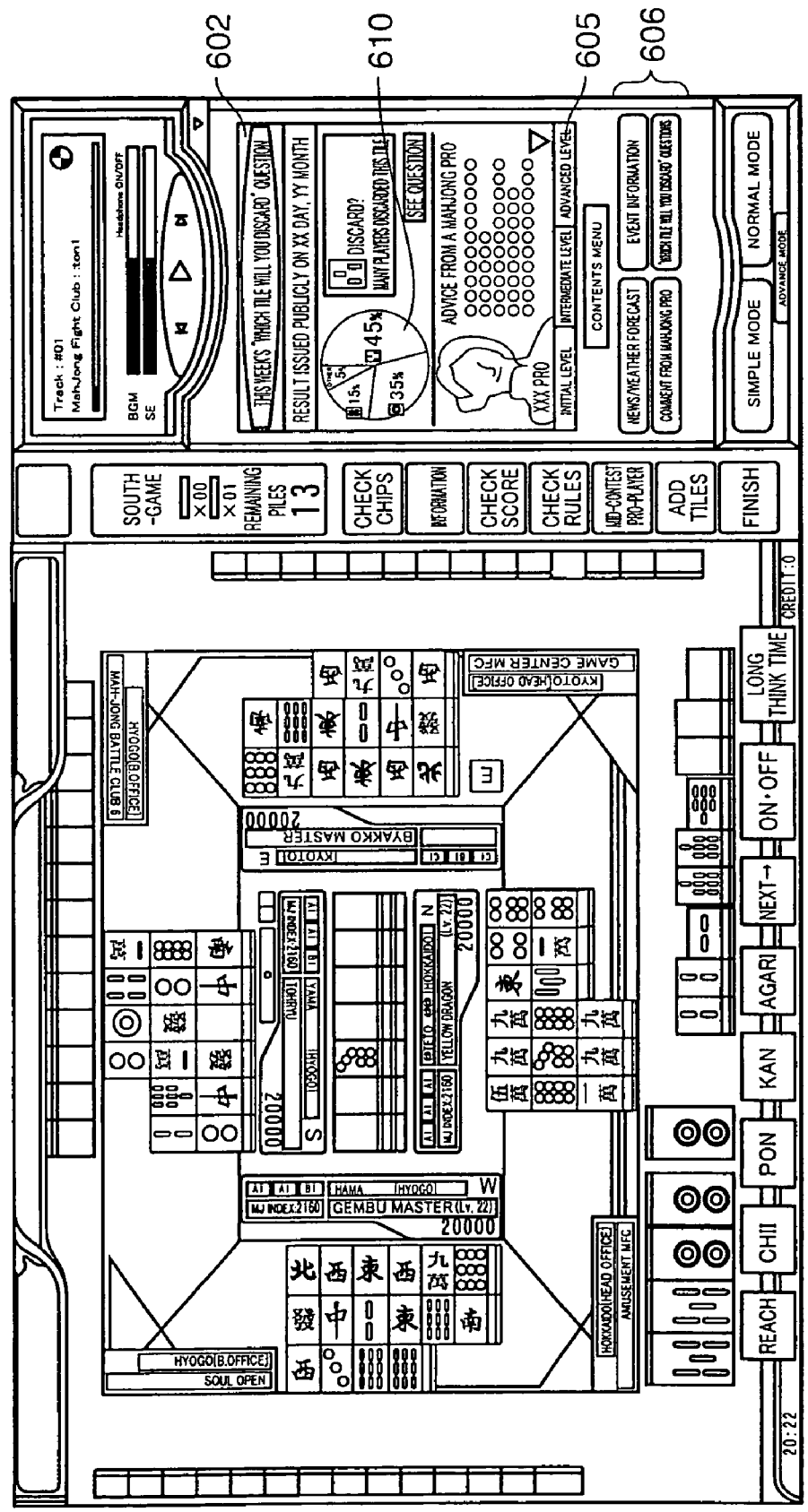
FIG. 27 is a display screen showing another example of tabulated results in a case where the multiple-choice question has been answered.

FIG. 27 is a display screen showing another example of tabulated results in a case where the multiple-choice question has been answered. The region 600 is classified substantially centrally into two areas, with a top half displaying the answer status of "in progress" in a same manner as FIG. 25, and a bottom half displaying "advice from a mahjong pro" (the "pro answer data" item of table 1). In FIG. 25 and FIG. 27, a correct answer for the answer to the multiple-choice question may be handled in accordance with the "advice from a mahjong pro" or in accordance with the maximum number.

It should be noted that the present invention can also take the following embodiments.

(A) The present embodiment was described in regard to a case in which the game carried out by the client terminal devices 1 was a mahjong game, but other embodiments are also possible of games carried out by multiple players. For example, other embodiments include card games, go games, shogi games, shooting games, and racing games.

(B) In the present embodiment, the secondary game is a multiple-choice question having options, in particular here a selection of a tile to be discarded from an arranged hand in a mahjong game (a selection of close to correct answer or recommended answer, that is, a selection of an answer most selected by a multitude of players), but there is no limitation to this and various embodiments of secondary games can be employed. For example, in a case where the primary game is a card game, the secondary game may be a different type of card game supposing a situation of a final option. This may be a completely different type of game to the primary game played on the client terminal device 1 (for example, in a case where the primary game is a mahjong game, the secondary game may be a shogi game), but it is preferable to use a secondary game that, although different from the primary game, has relevancy. Further still, a secondary game is possible in which correct answers are derived. Furthermore, the secondary game is not limited to multiple-choice questions, and may be a so-called mini game in which a result is produced in a short time, for example a commonly known game such as a shooting game or the like.

(C) The present embodiment was described in regard to a case where the store server device 2 was provided, but an embodiment is possible in which the client terminal devices 1 connect to the center server device 3 via a network.

(D) In the present embodiment, the configuration of connection (network) of the center server device 3, the store server devices 2, and the client terminal devices 1 is not limited to that shown in FIG. 1. For example, various connection embodiments are conceivable as connection embodiments between the client terminal devices 1 and the center server device 3 without using the store server devices 2, including ring configurations, tree configurations, and star configurations. In this case, a tree configuration connection embodiment is preferable. Furthermore, an embodiment is possible in which, by providing the functionality of the center server device 3 to a client terminal device 1, a single client terminal device 1 may connect as a host terminal device to another client terminal device 1. Furthermore, an embodiment is possible in which the functionality of the center server device 3 is provided to a store server device 2 to connect client terminal devices 1 within a store. As shown in FIG. 1, store server devices 2 are provided between the center server device 3 and the client terminal devices 1, and embodiments are preferable in which distributed processing is performed among the center server device 3, the store server devices 2, and the client terminal devices 1. In this case, it is preferable that a store server device 2 is provided in each store, and each client terminal device 1 connects to the store server device.

(E) In the present embodiment, the secondary games that were distributed were prepared corresponding to player capabilities, but there is no limitation to this, and embodiments are possible in which a specially prepared secondary game is distributed to the relevant player with respect to players who have answered correctly (in a case where a recommendation is made as a correct answer and a case where a multitude of players answer correctly). Special secondary games include games having a very high degree of difficulty and games of a different type.

(F) The present embodiment involves a network competition mahjong game, and therefore it is possible to answer the secondary game (question) during the time of several tens of seconds waiting for three players as opponents, and it is possible to achieve effective use of waiting times. Furthermore, embodiments are possible in which answers are readily received during the game, but in competitive games, in offering (displaying) a secondary game, a time limit may be arranged (for example, to perform control within a predetermined time each time a self operation finishes) with consideration to the time length during operation of another player's side.

(G) In the present embodiment, multiple-choice questions of a division corresponding to player capabilities or another division were distributed en bloc from the game server device, but the multiple-choice question management unit 361g may be given a monitoring function (monitoring means) that monitors and determines whether answers have been received at the center server device 3 for answers of multiple-choice questions of a division corresponding to the relevant player's capabilities in regard to a player in mid-play on a certain client terminal device 1, and due to this monitoring function, when it has been determined that the answers have been received, the multiple-choice question management unit 361h may permit distribution of a multiple-choice question of another capability division to the player in mid-play at the relevant client terminal device 1. This enables only a necessary information amount to be distributed on these occasions.

As described above, a new game server device is communicably connected to multiple game terminal devices on which development of a game is controlled by receiving operations from players and that is capable of monitoring at least whether or not a game is being executed, and is provided with: a player information receiving means for obtaining player capability information contained in information of a player who is playing the game terminal device, a secondary game storage means for storing secondary games, which are different from the game content, classified respectively according to capability, a secondary game distribution means for distributing to the game terminal device during game execution a secondary game of a division corresponding to a capability of a player in mid-play obtained from that game terminal device, a play result receiving means for receiving play results in regard to play of the distributed secondary game from the multiple game terminal devices, tabulating means for tabulating the play results received from the game terminal devices respectively, and a tabulated result transmitting means for returning the tabulated result to the game terminal devices that transmitted the play results.

With this configuration, secondary games that are classified respectively according to capability and are different from the game content are stored in the secondary game storage means. Then, when player capability information contained in information of the player to play at the game terminal device is obtained by the player information receiving means, distribution is carried out to the game terminal device during game execution by the secondary game distribution means of a secondary game of a division corresponding to player capability in mid-play obtained from the game terminal device. Further still, when the play result receiving means receives play results in regard to play of the distributed secondary game from the multiple game terminal devices, the tabulating means tabulates the play results received from the game terminal devices respectively, and the tabulated results are returned by the tabulated result transmitting means to the game terminal devices that sent the play results. Accordingly, during game play of a primary game, secondary games that take into account the capabilities of the player in that game are offered to a multitude of players during the game, and by tabulating results thereof and giving feedback to (informing) players of the results, a more absorbingly interesting game environment can be provided.

In the game server device, it is preferable that a monitoring means is further provided for determining, in regard to a player in mid-play on a certain game terminal device, whether or not a result of a played secondary game of a division corresponding to a capability of that player has been received, and that when the monitoring means has determined that the play result has been received, the secondary game distribution means permits distribution of a secondary game of another capability division to the player in mid-play at that game terminal device. With this configuration, the monitoring means determines, in regard to a player in mid-play on a certain game terminal device, whether or not a result of a played secondary game of a division corresponding to a capability of that player has been received, and when the monitoring means has determined that the play result has been received, the secondary game distribution means permits distribution, that is, distribution is carried out, of a secondary game of another capability division to the player in mid-play at that game terminal device. Accordingly, in addition to a secondary game corresponding to player capabilities, it is possible to take on the challenge of a game below capabilities or above capabilities.

In the game server device, it is preferable that the secondary game storage means changes secondary game content each predetermined period, and the tabulating means transmits tabulated results midway during the predetermined period and a final tabulated result after the predetermined period has passed, and displays these results identifiably. With this configuration, the secondary games change for each predetermined period, and therefore it is possible to continuously provide secondary games that do not invite boredom and, moreover, since tabulated results can be referenced immediately as in progress results even within the predetermined period, it is possible to provide enhanced convenience.

In the game server device, it is preferable that the secondary game is a multiple-choice question having options, and the play result is a selected result with respect to any of the options. With this configuration, a multiple-choice question having options is used as the secondary game, and therefore it becomes possible to support almost seamless entrance to a multiple-choice question even during play of the primary game.

In the game server device, it is preferable that a correct answer determination means for determining whether or not the multiple-choice question is answered correctly is further provided, and when the correct answer determination means has determined that the question is answered correctly, the secondary game distribution means permits distribution of a multiple-choice question of another capability division to the player in mid-play at that game terminal device. With this configuration, in a case where the multiple-choice question has been answered correctly, a challenge can be taken for a multiple-choice question of another capability division, and therefore an absorbingly interesting game can be achieved.

In the game server device, it is preferable that a correct answer determination means for determining whether or not the multiple-choice question is answered correctly is further provided, and when the correct answer determination means has determined that the question is answered correctly, the secondary game distribution means permits distribution of a special question, which has been prepared separately to capability-classified multiple-choice questions, to the player in mid-play at that game terminal device. With this configuration, in a case where the multiple-choice question has been answered correctly, a challenge can be taken for a special question, and therefore an absorbingly interesting game can be achieved.

Furthermore, a new game terminal device communicably connected to a game server device that is communicably connected to at least another game terminal device, and in which development of a game is controlled by receiving operations from a player, is provided with: a player information transmitting means for transmitting player capability information contained in player information received from a player at a time of game commencement to the game service device, a secondary game receiving means for receiving during game execution a secondary game, which is transmitted from the game server device, in which secondary games different from the game content are classified respectively according to capability and stored, and which is of a division corresponding to a player capability, a play result receiving means for receiving play results of a player in the secondary game, a play result transmitting means for transmitting a received play result to the game service device, and a display processing means for receiving from the game server device a tabulated result of play results of the secondary game received from each game terminal device and performing display on a monitor.

With this configuration, the player information transmitting means transmits player capability information contained in player information received from a player at a time of game commencement to the game service device. Then, when the secondary game receiving means receives during game execution a secondary game, which is transmitted from the game server device, in which secondary games different from the game content are classified respectively according to capability and stored, and which is of a division corresponding to a player capability, the play result receiving means receives the play results of the player in the secondary game, and the received play results are transmitted to the game server device by the play result transmitting means. Further still, the display processing means receives from the game server device a tabulated result of play results of the secondary game received from each game terminal device and performing display on a monitor. Accordingly, during game play of a primary game, secondary games that take into account the capabilities of the player in that game can be offered to players during the game, and tabulated contents of results thereof can be confirmed, and therefore a more absorbingly interesting game environment can be provided.

Further still, in a game terminal device, it is preferable that a secondary game processing means is further provided for setting permissions of answers in the secondary games, and that the secondary game receiving means receives from the game server device a secondary game of a division corresponding to player capability and a secondary game not of a division corresponding to player capability, and the secondary game processing means grants permission to play a secondary game not of a division corresponding to player capability on condition that a secondary game of a division corresponding to player capability has been played according to the play result receiving means. With this configuration, secondary games are transmitted as play candidates from the game server device regardless of the division, and whether or not a player has played a secondary game of a division corresponding to the player's own capabilities is managed by the secondary game processing means, and when it is affirmed that the game has been played, play is permitted on a secondary game of a different division. Accordingly, there is no need to receive distribution in the event of a secondary game not of a division corresponding to player capability. That is, secondary games of a division corresponding to player capability and secondary games not of a division corresponding to player capability are distributed en bloc, and play permission is receivable individually, and therefore a process of individually distributing games can be made unnecessary.

In the game terminal device, it is preferable that the secondary game is a multiple-choice question having options, and the play result is a selected result with respect to any of the options. With this configuration, it becomes possible to support almost seamless entrance to a multiple-choice question even during play of the primary game.

Further still, a new secondary game management system provided with multiple game terminal devices on which development of a game is controlled by receiving operations from players and a game server device communicably connected to the multiple game terminal devices, wherein the game terminal device is provided with a player information transmitting means for transmitting player capability information contained in player information received from a player at a time of game commencement to the game service device, a secondary game receiving means for receiving a secondary game of a division corresponding to a capability of a player transmitted from the game server device during game execution, a play result receiving means for receiving play results of a player in the secondary game, a play result transmitting means for transmitting a received play result to the game service device, and a display processing means for receiving from the game server device a tabulated result of play results of the secondary game of each game terminal device and performing display on a monitor, the secondary game management system being provided with a player information receiving means for obtaining player capability information contained in information of a player who is playing the game terminal device, a secondary game storage means for storing secondary games, which are different from the game content, classified respectively according to capability, a secondary game distribution means for distributing to the game terminal device during game execution a secondary game of a division corresponding to a capability of a player in mid-play obtained from that game terminal device, a play result receiving means for receiving play results in regard to play of the distributed secondary game from the multiple game terminal devices, tabulating means for tabulating the play results received from the game terminal devices respectively, and a tabulated result transmitting means for returning the tabulated result to the game terminal devices that transmitted the play results.

In a same manner as the foregoing, with this configuration, during game play of a primary game, secondary games that take into account the capabilities of the player in that game are offered to a multitude of players during the game, and by tabulating results thereof and giving feedback to (informing) players of the results, a more absorbingly interesting game environment can be provided.

Further still, a new secondary game management method provided with multiple game terminal devices on which development of a game is controlled by receiving operations from players and a game server device communicably connected to the multiple game terminal devices, and that provides a secondary game from the game server device to the game terminal devices during game execution, involves: storing secondary games, which are classified respectively according to capability and different from the game content, on the game server device, receiving at the game server device player capability information contained in player information received at a game terminal device at a time of game commencement at each game service device, distributing to these game terminal devices a secondary game of a division corresponding to a capability of a player in mid-play obtained from the game terminal device from which the player information was received, receiving a play result of the secondary game that was played using the game terminal device from which the player information was received, and transmitting this play result to the game server device, and tabulating at the game server device the play results received from the game terminal devices respectively, returning the tabulated results to the game terminal devices that transmitted the play results, and displaying the tabulated results on a monitor of each game terminal device.

With these configurations, as described above, during game play of a primary game, secondary games that take into account the capabilities of the player in that game are offered to a multitude of players during the game, and by tabulating results thereof and giving feedback to (informing) players of the results, a more absorbingly interesting game environment can be provided.

The invention claimed is:

1. A game server device which is communicably connected to a plurality of game terminal devices on which development of a game is controlled by receiving operations from players, and which is capable of monitoring at least whether or not a game is being executed, the device comprising:
   player information receiving means for obtaining player capability information contained in information on a player who plays on a game terminal device;
   secondary game storage means for classifying, according to player capability, secondary games whose content differs from that of the game and storing the classified secondary games respectively;
   secondary game distribution means for distributing to the game terminal device from the secondary game storage means during game execution a secondary game in the classification according to a capability of a player, who is in play, obtained from the game terminal device;
   play result receiving means for receiving play results in regard to play of the distributed secondary game from the plurality of game terminal devices;
   tabulating means for tabulating the play results received from the game terminal devices, respectively; and
   tabulated result transmitting means for returning the tabulated result to the game terminal devices that have transmitted the play results.

2. The game server device according to claim 1, further comprising monitoring means for determining, in regard to a player, who is in play on a certain game terminal device, whether or not a result of a played secondary game in the classification in accordance with a capability of the player has been received,
   wherein, when the monitoring means has determined that the play result has been received, the secondary game distribution means permits distribution of a secondary game in another capability classification to the player who is in play at that game terminal device.

3. The game server device according to claim 1, wherein the secondary game storage means changes secondary game content each predetermined period, and the tabulating means transmits halfway tabulated results during the predetermined period and displays identifiably a final tabulated result after the predetermined period has passed.

4. The game server device according to claim 1, wherein the secondary game is a multiple-choice question having options, and the play result is a selected result with respect to any of the options.

5. The game server device according to claim 4, further comprising correct answer determination means for determining whether or not the multiple-choice question is answered correctly,
   wherein, when the correct answer determination means has determined that the question is answered correctly, the secondary game distribution means permits distribution of a multiple-choice question in another capability classification to the player who is in play at the game terminal device.

6. The game server device according to claim 4, further comprising correct answer determination means for determining whether or not the multiple-choice question is answered correctly,
   wherein, when the correct answer determination means has determined that the question is answered correctly, the secondary game distribution means permits distribution of a special question, which has been prepared separately to multiple-choice questions classified according to a player capability, to the player who is in play at the game terminal device.

7. A game terminal device communicably connected to a game server device which is communicably connected to at least another game terminal device, and in which development of a game is controlled by receiving operations from a player,
   the device comprising:
   player information transmitting means for transmitting player capability information contained in player information received from a player at a time of game commencement to the game service device;
   secondary game receiving means for receiving during game execution a secondary game, which is transmitted from the game server device, in which secondary games whose content differ from that of the game are classified according to a player capability respectively and stored, the secondary game to be received being classified according to a player capability;
   play result receiving means for receiving a play result of a player in the secondary game from the game server device;
   play result transmitting means for transmitting a received play result to the game service device; and
   display processing means for receiving from the game server device a tabulated result of play results of the secondary game received from each game terminal device and performing display on a monitor.

8. The game terminal device according to claim 7, further comprising secondary game processing means for setting permissions of answers in the secondary games, wherein
   the secondary game receiving means receives from the game server device a secondary game in a classification according to a player capability and a secondary game not in the classification according to a player capability, and the secondary game processing means grants permission to play the secondary game not in the classification according to a player capability on condition that the secondary game in the classification according to a player capability has been played according to the play result receiving means.

9. The game terminal device according to claim 7, wherein the secondary game is a multiple-choice question having options, and the play result is a selected result with respect to any of the options.

10. A secondary game management system, comprising:
a game server device which is communicably connected to a plurality of game terminal devices on which development of a game is controlled by receiving operations from players, and which is capable of monitoring at least whether or not a game is being executed, the game server device including:
   player information receiving means for obtaining player capability information contained in information on a player who plays on a game terminal device;
   secondary game storage means for classifying, according to player capability, secondary games whose content differs from that of the game and storing the classified secondary games respectively;
   secondary game distribution means for distributing to the game terminal device from the secondary game storage means during game execution a secondary game in the classification according to a capability of a player, who is in play, obtained from the game terminal device;
   play result receiving means for receiving play results in regard to play of the distributed secondary game from the plurality of game terminal devices;
   tabulating means for tabulating the play results received from the game terminal devices, respectively; and
   tabulated result transmitting means for returning the tabulated result to the game terminal devices that have transmitted the play results; and
a game terminal device communicably connected to the game server device which is communicably connected to at least another game terminal device, and in which development of a game is controlled by receiving operations from a player,
the game terminal device comprising:
   player information transmitting means for transmitting player capability information contained in player information received from a player at a time of game commencement to the game service device;
   secondary game receiving means for receiving during game execution a secondary game, which is transmitted from the game server device, in which secondary games whose content differ from that of the game are classified according to a player capability respectively and stored, the second game to be received being classified according to a player capability;
   play result receiving means for receiving a play result of a player in the secondary game from the game server device;
   play result transmitting means for transmitting a received play result to the game service device; and
   display processing means for receiving from the game server device a tabulated result of play results of the secondary game received from each game terminal device and performing display on a monitor.

11. A secondary game management method of, with a plurality of game terminal devices on which development of a game is controlled by receiving operations from players and a game server device communicably connected to the plurality of game terminal devices being provided, providing a secondary game from the game server device to the game terminal devices during game execution, the method comprising:
   storing on the game server device secondary games, whose content differs from that of the game, classified according to a player capability respectively;
   receiving, at the game server device, player capability information contained in player information received at a game terminal device at a time of game commencement at each game terminal device;
   distributing to these game terminal devices a secondary game in a classification according to a capability of a player, who is in play, obtained from the game terminal device at which the player information has been received;
   receiving a play result of the secondary game that has been played using the game terminal device at which the player information has been received, and transmitting this play result to the game server device; and
   tabulating at the game server device the play results received from the game terminal devices respectively, returning the tabulated results to the game terminal devices that have transmitted the play results, and displaying the tabulated results on a monitor of each game terminal device.

* * * * *

UNITED STATES PATENT AND TRADEMARK OFFICE
CERTIFICATE OF CORRECTION

PATENT NO. : 8,137,190 B2
APPLICATION NO. : 12/450541
DATED : March 20, 2012
INVENTOR(S) : Yasuyuki Nagatomo et al.

It is certified that error appears in the above-identified patent and that said Letters Patent is hereby corrected as shown below:

Title page, Item (75): Change Masahio Nishiyama, Miki (JP)

to

Masahiro Nishiyama, Miki (JP).

Signed and Sealed this
Seventh Day of August, 2012

David J. Kappos
*Director of the United States Patent and Trademark Office*